United States Patent
Hirai et al.

(10) Patent No.: US 12,248,408 B2
(45) Date of Patent: Mar. 11, 2025

(54) INFORMATION PROCESSING SYSTEM

(71) Applicant: Hitachi, Ltd., Tokyo (JP)

(72) Inventors: Tatsuya Hirai, Tokyo (JP); Hideo Saito, Tokyo (JP)

(73) Assignee: HITACHI VANTARA, LTD., Yokohama (JP)

(*) Notice: Subject to any disclaimer, the term of this patent is extended or adjusted under 35 U.S.C. 154(b) by 279 days.

(21) Appl. No.: 17/938,996

(22) Filed: Sep. 7, 2022

(65) Prior Publication Data

US 2023/0229600 A1 Jul. 20, 2023

(30) Foreign Application Priority Data

Jan. 14, 2022 (JP) ................................ 2022-004239

(51) Int. Cl.
*G06F 21/72* (2013.01)
*G06F 12/14* (2006.01)
*G06F 21/78* (2013.01)

(52) U.S. Cl.
CPC .. *G06F 12/1408* (2013.01); *G06F 2212/1052* (2013.01)

(58) Field of Classification Search
CPC ......... G06F 12/1408; G06F 2212/1052; G06F 21/56; G06F 21/72; G06F 21/78; H04L 63/0428; H04L 63/14
See application file for complete search history.

(56) References Cited

U.S. PATENT DOCUMENTS

| | | | |
|---|---|---|---|
| 10,389,740 B2 | 8/2019 | Langton | |
| 2016/0365150 A1* | 12/2016 | Tokiwa | G11C 7/1063 |
| 2018/0157600 A1* | 6/2018 | Lesartre | G06F 12/1063 |
| 2020/0159657 A1* | 5/2020 | Kida | G06F 9/466 |
| 2020/0326889 A1* | 10/2020 | Norman | G06F 11/1068 |
| 2021/0357152 A1* | 11/2021 | Moriyasu | G11C 16/32 |
| 2023/0152999 A1* | 5/2023 | Hyun | G06F 3/064 |
| | | | 711/154 |

FOREIGN PATENT DOCUMENTS

| | | |
|---|---|---|
| JP | 2019-021131 A | 2/2019 |
| WO | 2014/070499 A1 | 5/2014 |

OTHER PUBLICATIONS

Japanese Office Action issued on Oct. 22, 2024 for Japanese Patent Application No. 2022-004239.

* cited by examiner

*Primary Examiner* — Trong H Nguyen
(74) *Attorney, Agent, or Firm* — Volpe Koenig

(57) ABSTRACT

When having detected that key data set to an accelerator by command information is not key data permitted to use, a monitor unit issues, to a storage control unit, a suspension request for suspending processing related to writing of data, a compute unit having received an instruction from an application program reads data from the storage device, encrypts read data using the accelerator, and issues, to the storage control unit, an instruction to write encrypted data to the storage device, and when having received the suspension request, the storage control unit suspends processing related to writing of data to the storage device.

4 Claims, 16 Drawing Sheets

SYSTEM ON DRIVE 0: Hypervisor, Guest OS, Bare Metal OS

| KEY USAGE ENTITY IDENTIFIER (1100) | KEY VALUE (1101) | HASH VALUE (1102) |
|---|---|---|
| 540e920a-d08c-... (STORAGE CONTROL PROGRAM) | 9a25bf01... | 30af0c75... |
| | 386bd24c... | 1e26d439... |
| | ... | ... |
| a813d7cc-166b-... (Virtual Machine A) | 217ec50f... | 9937c0df... |
| | 35a3281d... | 4a25bd0f... |
| | ... | ... |
| 357f01ec-7043-... (Virtual Machine B) | 9de83375... | 27fd05aa... |
| | 846c0ab1... | 84c22ba0... |
| | ... | ... |
| ... | ... | ... |

| KEY USAGE ENTITY IDENTIFIER (1200) | KEY VALUE (1201) | HASH VALUE (1202) |
|---|---|---|
| 431f01dc-109b-... (STORAGE CONTROL PROGRAM) | 3357da75... | a19258df... |
| | 4108cc6a... | 913c8ed2... |
| | ... | ... |

| KEY USAGE ENTITY IDENTIFIER (1300) | KEY VALUE (1301) | HASH VALUE (1302) |
|---|---|---|
| 65a81c37-de09-... (Virtual Machine A) | 53f1ea0d... | 9135c88d... |
| | 190d2496... | 4a2a0f73... |
| | ... | ... |
| 3809ca1f-26ba-... (Virtual Machine B) | f2db359c... | 20d3eb99... |
| | 480c1bea... | b85537ce... |
| | ... | ... |
| ... | ... | ... |

| INSTRUCTION CODE | DATA/ARGUMENTS |
|---|---|
| ... | ... |
| Move | %xmm1, (%rdx) |
| Crypto Key Generation Assist | %xmm2, %xmm1, 0 |
| ... | ... |

1400 — INSTRUCTION CODE
1401 — DATA/ARGUMENTS

INFORMATION PROCESSING SYSTEM

BACKGROUND OF THE INVENTION

1. Field of the Invention

The present invention generally relates to a technique for managing data.

2. Description of the Related Art

Conventionally, an ICT infrastructure system is often configured with three tiers called 3-Tier type. The three tiers are a server/compute tier that provides resources for computation, a storage tier that provides resources for storing data, and a network tier that provides resources for connecting resources of the compute tier and resources of the storage tier. The system configured in this manner has an advantage that the user can flexibly introduce necessary resources. On the other hand, it has recently been required to quickly start services such as SNS and video distribution. Therefore, when quick launch of these services with a small-scale hardware configuration is intended, hardware cost, time and effort required for setting, and the like, which are required to configure the system with the 3-Tier type, become relatively large, and may become a factor that hinders the start of the service.

Against the background as described above, in recent years, a system in a form called hyper-converged infrastructure (HCI) has been productized. The HCI type system has compute, storage, and a network between the both that are configured in one appliance according to the purpose. In recent years, with advancement of virtualization technology, there have been an increasing number of cases of introducing a virtual machine monitor (hypervisor) into an appliance and constructing a plurality of virtual machines (VM) to use them as equipment for compute or as equipment for storage. By placing such appliances in parallel and connecting among the appliances, the system can be easily expanded.

As described above, in the HCI type system, physical resources (processor, memory, network card, and the like) mounted on the appliance are shared by a plurality of VMs, hypervisors, and the like. Due to this, when breach or root of compromise (RoC) of root information regarding management occurs on any resource, all resources in the system are more liable to be breached. One of the factors causing RoC is malware that has intruded into a network to which an HCI type system is connected.

Majority of recent malware have a form of, when succeeds in intruding a piece of equipment connected to a certain network, searching for other resources connected to the network from which the vulnerability has not been removed, and after attaining intrusion and infection to the found resources, starts a breaching activity in response to a command from a malware control server (command & control server (C2 server) and the like). The reasons for this also include a purpose of confirming, through communication with the C2 server, that the environment where malware has attained intrusion is not a decoy environment. Inventions for detecting such malware include the following inventions.

In the invention described in WO 2014/070499, a client device connected to a network is prevented from being infected by malware by, against intrusion of the malware into the client device in the form of an attached file of an electronic mail or the like, monitoring a file transmitted to the client device in a middle of the network (before the client device) and quarantining the file suspected to be malware. The file determined by the monitor unit to be highly likely to be malware is temporarily stored in a quarantine communicating with the monitor unit. Whether or not the file is malware is evaluated on the basis of the latest information acquired as needed from a reputation server at a remote location. For a file evaluated to be malware, information (hash value, signature, and the like) for specifying the file is registered in an antivirus database. With the mechanism as described above, whether or not a file is malware is determined on the basis of the latest information, and information regarding malware managed by itself is updated.

In the invention described in U.S. Pat. No. 10,389,740, in a case where a file suspected to be malware is to be stored in a client device by processing such as downloading, the file is operated in a sandboxing environment, and behavior of the file is analyzed to evaluate whether or not the file is malware. The evaluation is achieved by analyzing whether or not network communication by the file is similar to network communication by malware.

SUMMARY OF THE INVENTION

Both of the invention described in WO 2014/070499 and the invention described in U.S. Pat. No. 10,389,740 are applicable and useful when the VM in the HCI type system is regarded as a client device in the invention.

However, in the invention described in WO 2014/070499, the authenticity of malware is evaluated on the basis of information acquired from an external malware-related information collector represented by a reputation server. Therefore, even if a certain file is malware, there is a problem that the file is not determined to be malware in a case where information regarding the file is not included in the information acquired from the reputation server.

In the invention described in U.S. Pat. No. 10,389,740, it takes a certain time to analyze a file suspected to be malware. For this reason, in a case where data breach progresses until the analysis is completed or a file is temporarily quarantined until the authenticity of malware is confirmed, there is a problem that even if the file is not malware, the file cannot be used until the analysis is completed.

In particular, in a case where the malware that has intruded into a network is a zero-day type ransomware program (ransomware), the malware cannot be detected by the invention described in WO 2014/070499, and there is a concern, in the invention described in U.S. Pat. No. 10,389,740, of breach in which the data encrypted by using an accelerator by the ransomware overwrites the data stored in a storage device, and damage increases.

The present invention has been made in view of the above points, and an object is to propose an information processing system and the like capable of appropriately managing data stored in a storage device.

In order to solve such a problem, in the present invention, an information processing system includes: an accelerator that is capable of encrypting data; a storage device; a compute unit that operates an application program; a storage control unit that processes a request for reading and writing data from and to a specific storage space issued by the compute unit in accordance with an instruction issued by the application program; and a monitor unit that monitors command information issued from the compute unit that sets, to the accelerator, key data used by the compute unit specified by the application program in order for the application program to encrypt data using the accelerator, in which when having detected that key data set in the accelerator by the command information is not key data permitted to use, the monitor unit issues, to the storage control unit, a suspension request for suspending processing related to data writing, the compute unit having received an instruction from an application program reads data from the storage device, encrypts read data using the accelerator, and issues, to the storage control unit, an instruction to write encrypted data into the storage device, and when having received the suspension request, the storage control unit suspends processing related to writing of data to the storage device.

In the above configuration, for example, when it is detected that the key data set to the accelerator is unpermitted key data, processing related to writing is not performed, and therefore, it is possible to avoid a situation in which data in the storage device is overwritten after the key data is set by ransomware.

According to the present invention, it is possible to achieve a highly reliable information processing system. Problems, configurations, and effects other than those described above will be made clear by the following description of embodiments.

BRIEF DESCRIPTION OF THE DRAWINGS

FIG. 11 is a diagram illustrating an example of available key-related information placed on the memory of the HCI node according to the first embodiment;

FIG. 12 is a diagram illustrating an example of available key-related information placed on the memory of the storage control node according to the first embodiment;

FIG. 13 is a diagram illustrating an example of available key-related information placed on the memory of the compute node according to the first embodiment;

FIG. 14 is a diagram illustrating an example of command information according to the first embodiment;

DESCRIPTION OF THE PREFERRED EMBODIMENTS

(I) First Embodiment

Figure 1:
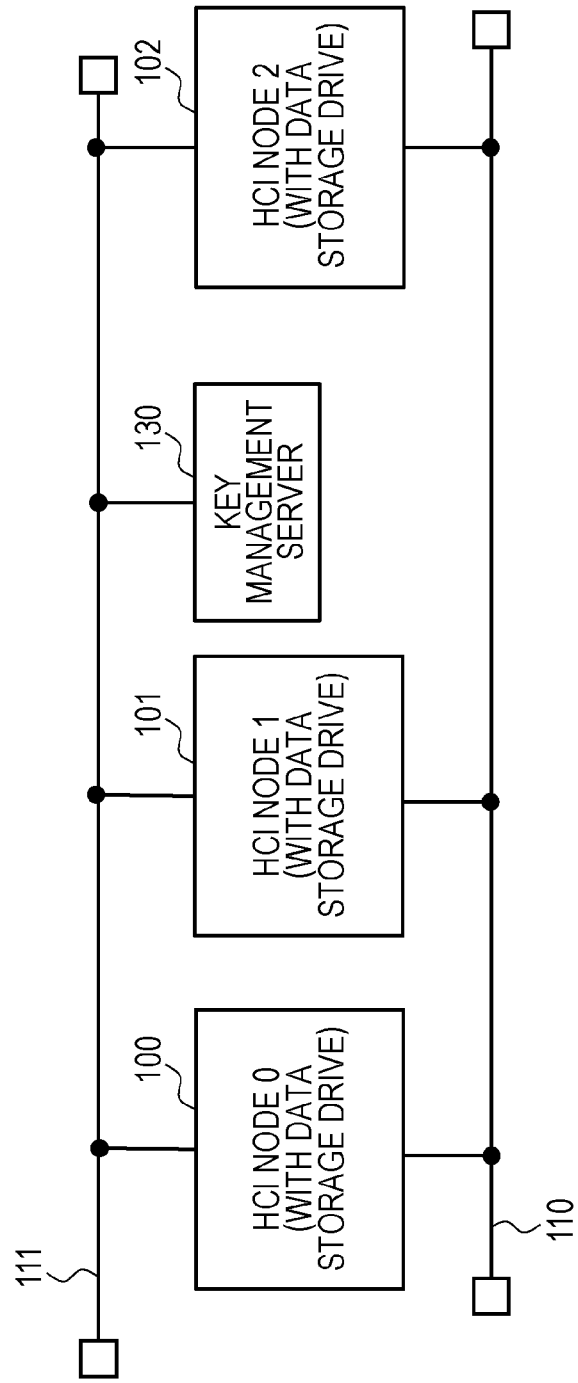
FIG. 1 is a block diagram illustrating an example of a configuration of an HCI type information processing system according to a first embodiment.

The present invention relates to an information processing system, a storage system, a data transfer method, and a data encryption/decryption method, and is suitably applied to a system equipped with a flash drive, for example. An embodiment of the present invention will be described below in detail. However, the present invention is not limited to the embodiment.

In the information processing system of the present embodiment, for example, a server device including a compute unit and a storage control unit is provided with a key monitor unit that grasps all pieces of key data permitted to use. The key monitor unit monitors key data used for encryption set in a cryptographic arithmetic accelerator. When having detected that ungrasped key data is set to the cryptographic arithmetic accelerator, the key monitor unit transmits, to the storage control unit, a request not to perform I/O processing of data. When having received the request from the key monitor unit, the storage control unit does not perform I/O processing on a storage space (for example, volume) managed by the storage control unit. Note that the key data used for encryption may be key data for encryption/decryption or key data for encryption.

According to the above configuration, for example, in a case where a software program not permitted to introduce, such as ransomware, encrypts data using the cryptographic arithmetic accelerator, it is possible to prevent early the original data from being overwritten with the encrypted data.

In the present embodiment, each of the HCI type system and the 3-Tier type system will be described as an information processing system. In the present embodiment, a case where ransomware intrudes into each of an HCI node of the HCI type system, a storage control node of the 3-Tier type system, and a compute node of the 3-Tier type system will be described as an example.

Hereinafter, the present embodiment will be described in detail with reference to the drawings. The following description and drawings are illustrative of the present invention and are omitted and simplified as appropriate for a clearer description. Not all combinations of features described in the embodiment are essential to the solution of the invention. The present invention is not limited to the embodiment, and all application examples consistent with the idea of the present invention are included in the technical scope of the present invention. Those skilled in the art can make various additions, modifications, and the like to the present invention within the scope of the present invention. The present invention can also be carried out in various other forms. Unless otherwise specified, each constituent element may be plural or singular.

In the following description, various types of information are sometimes described with expressions such as a table, a chart, and a list, but the various types of information may be expressed with data structures other than these. In order to indicate that they do not depend on data structures, "XX table", "XX list", and the like are sometimes called "XX information". In describing the content of each piece of information, expressions such as "identification information", "identifier", "name", "ID", and "number" are used, but these can be replaced with one another.

In the following description, when the same type of elements are described in without distinction, reference signs or common numbers in reference signs are used, or the reference numbers are omitted. When the same type of elements are described with distinction, reference signs of the elements are sometimes used or the IDs allocated to the elements are sometimes used instead of the reference signs.

The program may be installed from a program source to a device such as a computer. The program source may be, for example, a program distribution server or a computer-readable storage medium. When the program source is a program distribution server, the program distribution server includes a processor (for example, central processing unit: CPU) and a storage resource, and the storage resource may further store a distribution program and a distribution target program. Then, when the processor of the program distribution server executes a distribution program, the processor of the program distribution server may distribute the distribution target program to another computer. In the following description, two or more programs may be implemented as one program, or one program may be implemented as two or more programs.

Notations such as "first", "second", and "third" in the present description and the like are given to identify constituent elements, and do not necessarily limit the number or order. The number for identifying a constituent element is used for each context, and a number used in one context does not necessarily indicate the same configuration in another context. It does not prevent a constituent element identified by a certain number from functioning also as a constituent element identified by another number.

FIG. 1 is a block diagram illustrating an example of the configuration of the HCI type information processing system according to the present embodiment. The information processing system includes one or more HCI nodes 100, 101, and 102 and a key management server 130 as elements. The HCI nodes 100, 101, and 102 are denoted with suffixes 0, 1, and 2. The HCI node is connected by a management communication network 111 and a data communication network 110. Management information is transferred on the management communication network 111, and data is transferred on the data communication network 110.

Figure 2:
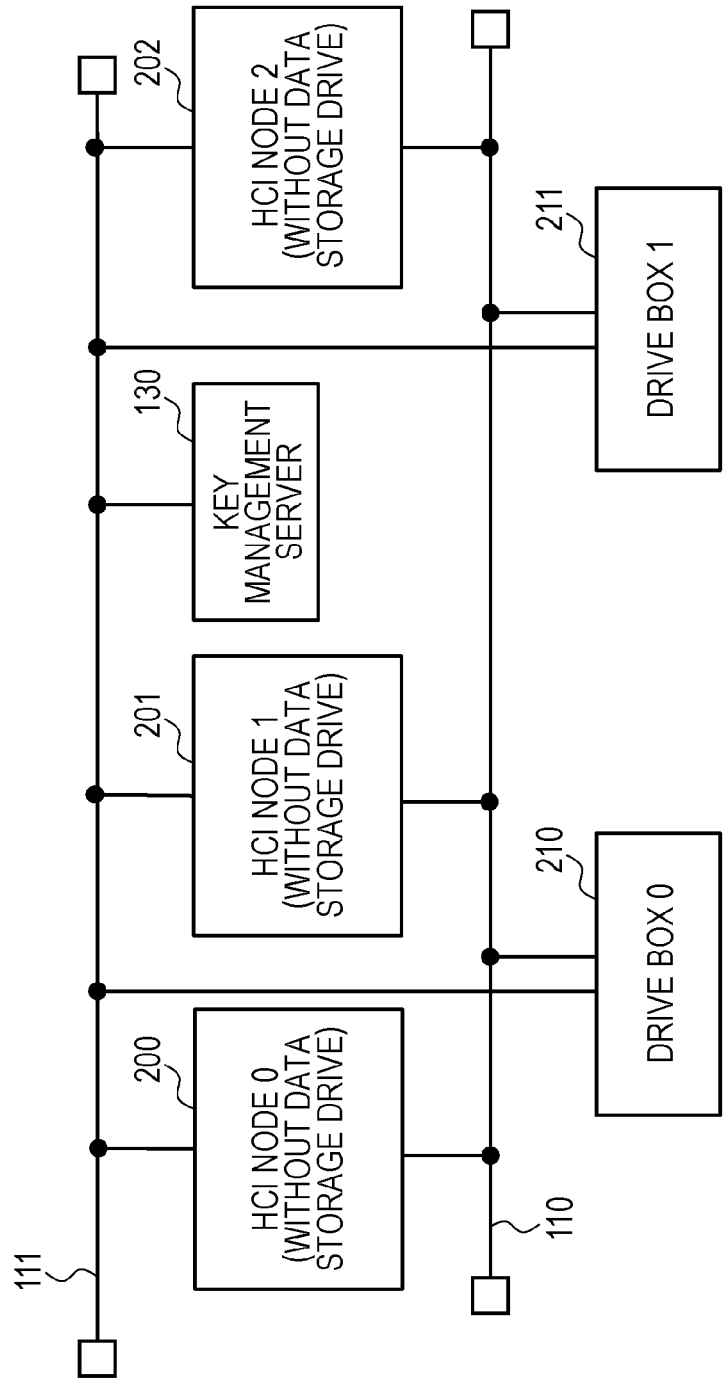
FIG. 2 is a block diagram illustrating an example of the configuration of the HCI type information processing system according to the first embodiment.

Similarly to FIG. 1, FIG. 2 is a block diagram illustrating an example of the configuration of the HCI type information processing system according to the present embodiment. However, in the information processing system, a storage drive (drive) that stores data is mounted in a drive box outside the HCI node, and the drive box is connected to each HCI node via a network. The information processing system includes one or more HCI nodes 200, 201, and 202, a key management server similar to the key management server 130, and drive boxes 210 and 211 as elements. The HCI nodes 200, 201, and 202 are denoted with suffixes 0 to 2, and the drive boxes 210 and 211 are denoted with suffixes 0 and 1. The HCI nodes 200, 201, and 202 and the drive boxes 210 and 211 are connected by the management communication network 111 and the data communication network 110. Management information is transferred on the management communication network 111, and data is transferred on the data communication network 110.

Figure 3:
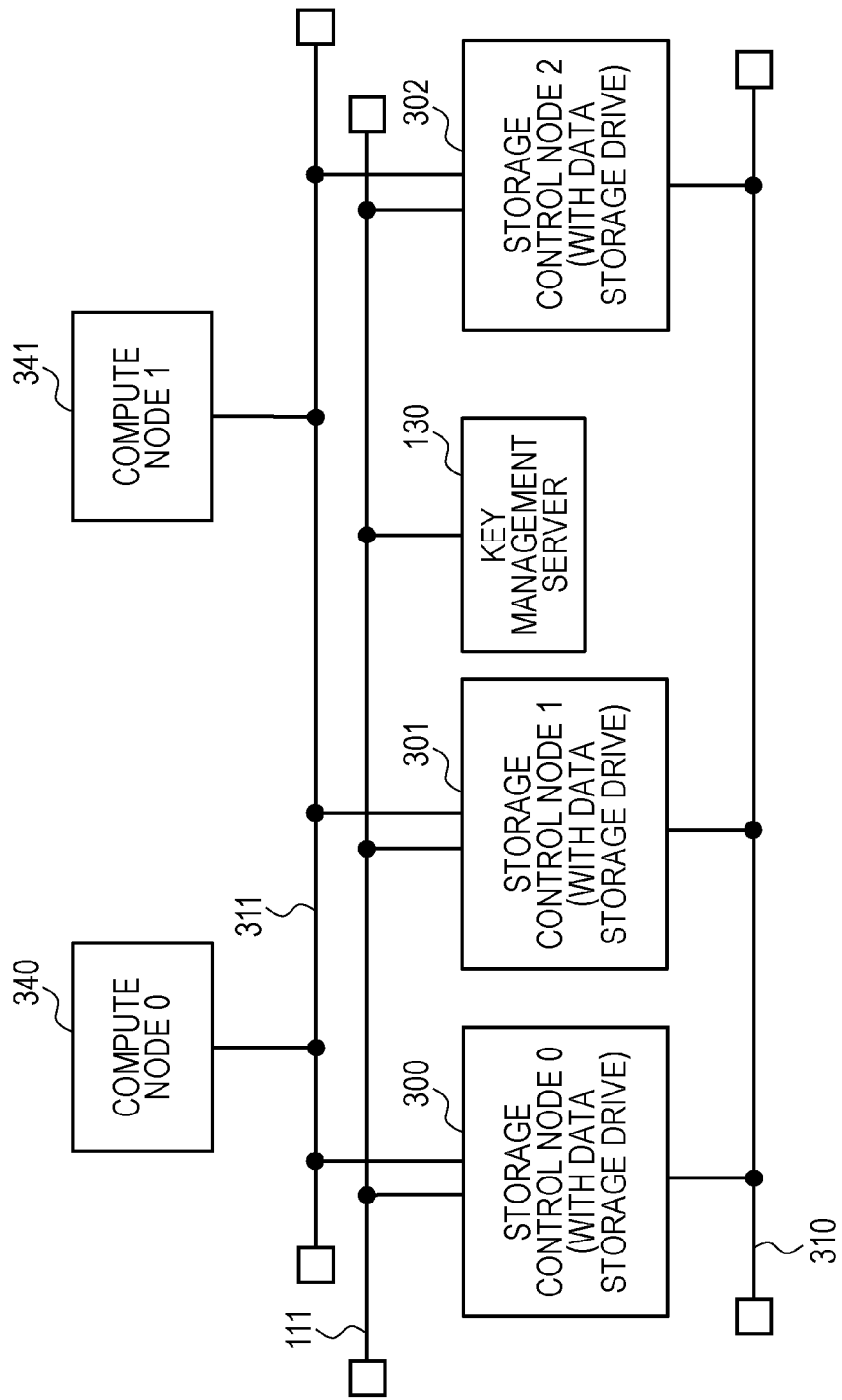
FIG. 3 is a block diagram illustrating an example of a configuration of a 3-Tier type information processing system according to the first embodiment.

FIG. 3 is a block diagram illustrating an example of the configuration of the 3-Tier type information processing system according to the present embodiment. The information processing system includes one or more compute nodes 340 and 341, a key management server similar to the key management server 130, and storage control nodes 300, 301, and 302 as elements. The compute nodes 340 and 341 are denoted with suffixes 0 and 1, and the storage control nodes 300, 301, and 302 are denoted with suffixes 0 to 2. The compute nodes 340 and 341 and the storage control nodes 300, 301, and 302 are connected to the management communication network 111. The compute nodes 340 and 341 and the storage control nodes 300, 301, and 302 are connected to a storage communication network 311, and the storage control nodes 300, 301, and 302 are connected to a back-end communication network 310. Management information is transferred on the management communication network 111. Data is transferred on the storage communication network 311 between the compute node and the storage control node, and data is transferred on the back-end communication network 310 between the storage control nodes.

Figure 4:
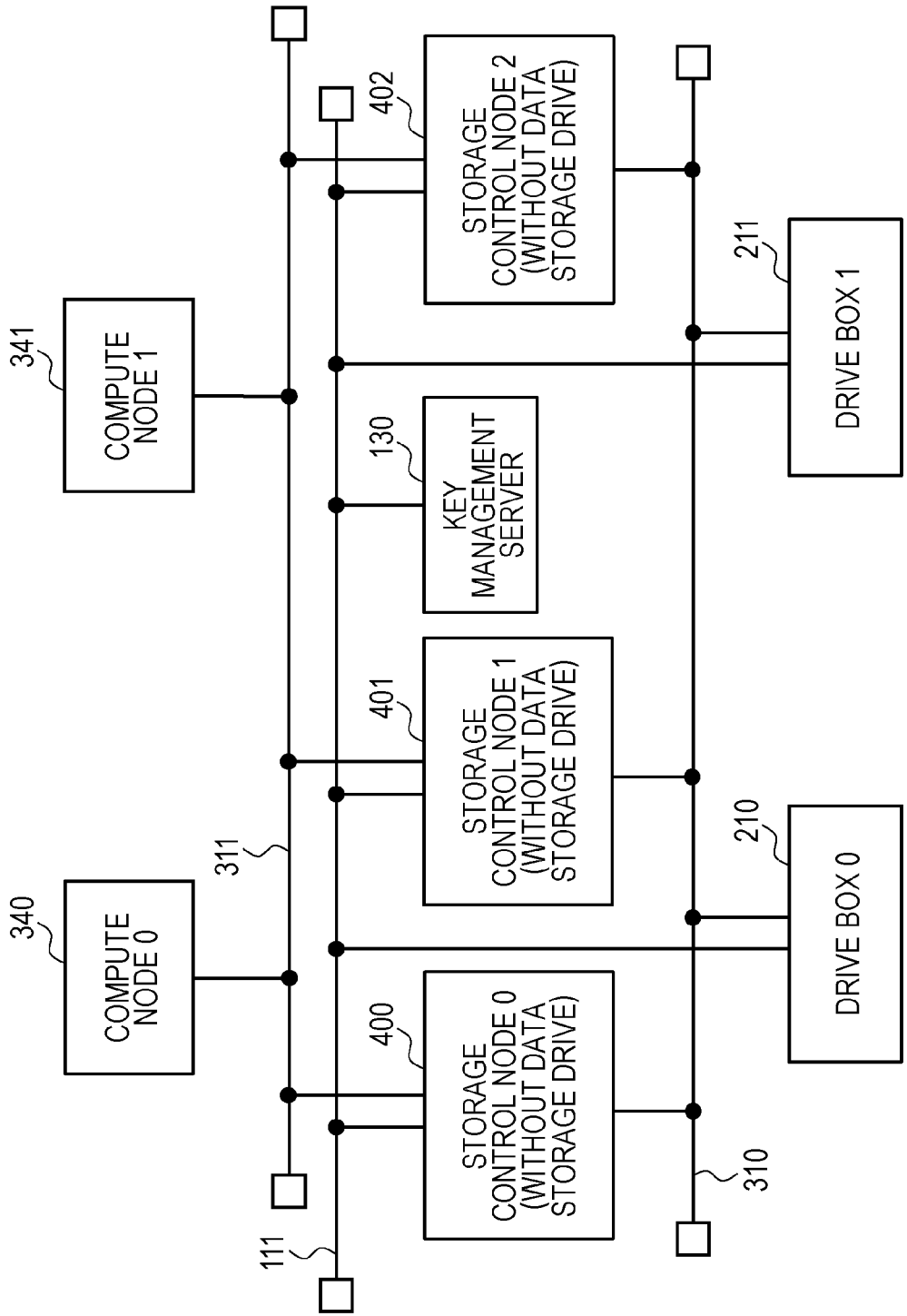
FIG. 4 is a block diagram illustrating an example of the configuration of the 3-Tier type information processing system according to the first embodiment.

FIG. 4 is a block diagram illustrating an example of the configuration of the 3-Tier type information processing system according to the present embodiment. The information processing system includes the one or more compute nodes 340 and 341, a key management server similar to the key management server 130, storage control nodes 400, 401, and 402, and the drive boxes 210 and 211 as elements. The compute nodes 340 and 341 are denoted with suffixes 0 and 1. The storage control nodes 400, 401, and 402 are denoted with suffixes 0 to 2. The drive boxes 210 and 211 are denoted with suffixes 0 and 1. The compute nodes 340 and 341, the storage control nodes 400, 401, and 402, and the drive boxes 210 and 211 are connected to the management communication network 111. The compute nodes 340 and 341 and the storage control nodes 400, 401, and 402 are connected to the storage communication network 311, and the storage control nodes 400, 401, and 402 and the drive boxes 210 and 211 are connected to the back-end communication network 310. Management information is transferred on the management communication network 111. Data is transferred on the storage communication network 311 between the compute node and the storage control node, and data is transferred on the back-end communication network 310 between the storage control node and the drive box.

Next, roles of the HCI node, the drive box, the storage control node, and the compute node illustrated in FIGS. 1 to 4 will be briefly described.

The HCI nodes 100, 101, and 102 are general-purpose computer devices in which an application software program (application program) operates on each HCI node, and the HCI nodes 100, 101, and 102 have built-in drives that store data used by the application program. The HCI nodes 200, 201, and 202 are the same as the HCI nodes 100, 101, and 102 except that no drives are built in. Hereinafter, unless otherwise specified, "data" means data used by the application program.

The drive boxes 210 and 211, in which a plurality of data storage drives are normally connected inside, are appliances that write data received in response to a data write request from the HCI nodes 200, 201, and 202, the storage control nodes 400, 401, and 402, and the like without built-in data storage drives, read data stored in the drives in response to a data read request, and thus transmit the data to a request source of the data.

The storage control nodes 300, 301, and 302 and the storage control nodes 400, 401, and 402 are general-purpose computer devices that receive write requests and read requests of data from the compute nodes 340 and 341, and depending on the configuration, write data requested to the drives or drive boxes mounted on themselves and read data requested from the drives or the drive boxes. In the present embodiment, the storage control nodes 300, 301, and 302 are in a form of built-in drives for storing data, and the storage control nodes 400, 401, and 402 do not have built-in drives and data are stored in the drive boxes 210 and 211.

The compute nodes 340 and 341 are general-purpose computer devices that function as hosts for the storage control nodes 300, 301, and 302 and the storage control nodes 400, 401, and 402. The compute nodes 340 and 341 transmit data write requests and data read requests to the storage control nodes 300, 301, and 302 or the storage control nodes 400, 401, and 402 via the storage communication network 311 through a user operation and an application program operating on the compute nodes. For data for writing, the compute node transmits target data to the storage control node following the write request. For reading data, the compute node transmits a read request to the storage control node, and then receives target data from the storage control node.

Each of the HCI nodes 100, 101, and 102, the HCI nodes 200, 201, and 202, the storage control nodes 300, 301, and 302, and the storage control nodes 400, 401, and 402 are connected to the key management server 130 via the management communication network 111. The key management server 130 is a server having a function of generating and storing key data necessary for encrypting data to be written to a drive (data storage drive in the HCI nodes 100, 101, and 102 or data storage drive in the storage control nodes 300, 301, and 302) or a drive box (drive boxes 210 and 211) and for decrypting data read from the drive or the drive box. A main example of a protocol used for communication between the HCI node or the storage control note and the key management server 130 is the Key Management Interoperability Protocol (KMIP). A message transferred in accordance with the protocol is usually protected in accordance with a Transport Layer Security (TLS) protocol.

Next, schematic configurations of the HCI node, the key management server, the drive box, the storage control node, the compute node, and the drive box illustrated in FIGS. 1 to 4 will be described with reference to FIGS. 5, 6, and 7. Functional units of the HCI node, the storage control node, and the compute node illustrated in FIGS. 1 to 4 will be described with reference to FIGS. 8, 9, and 10.

Figure 5:
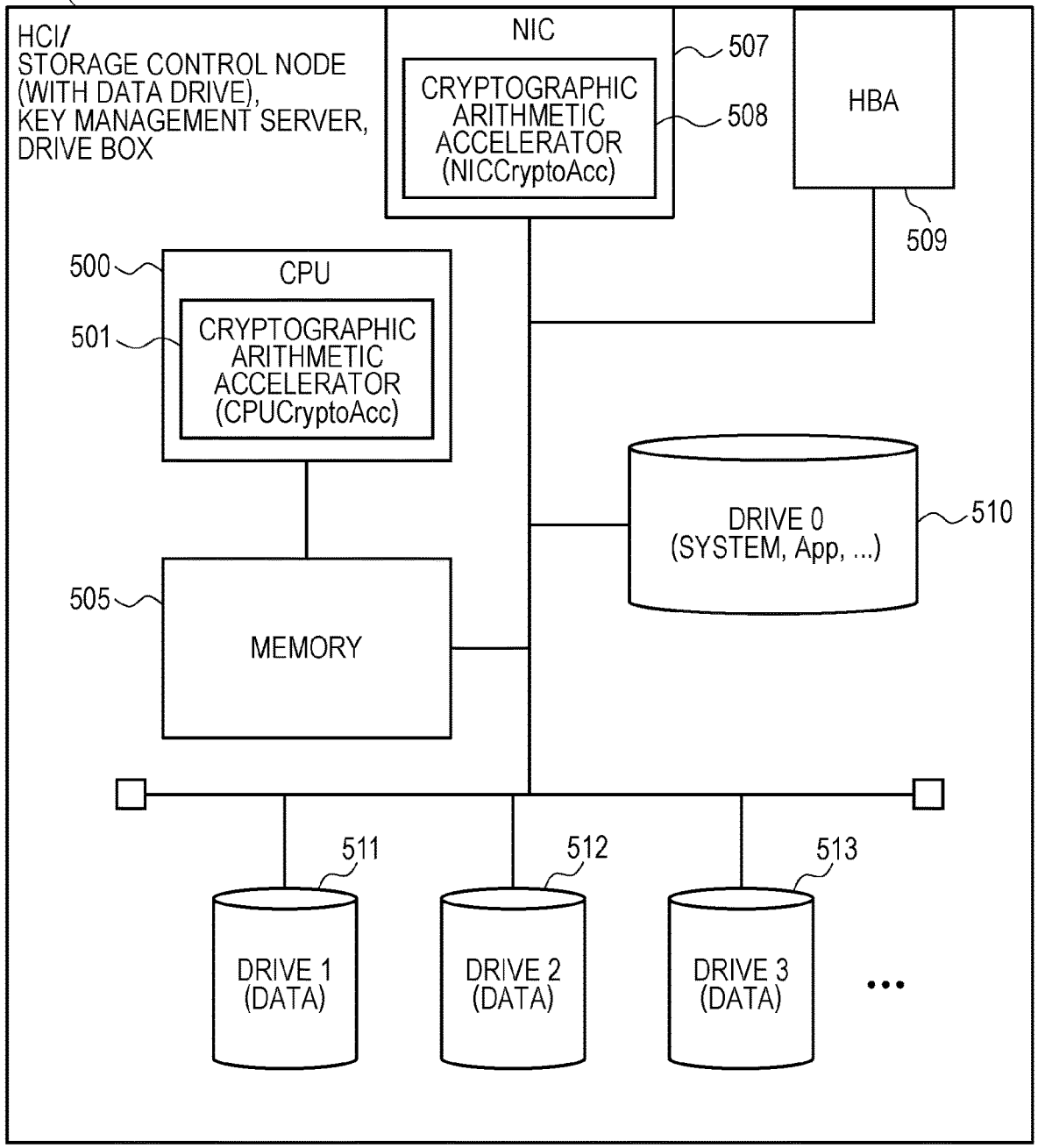
FIG. 5 is a diagram illustrating an example of configurations of an HCI node (with data storage drive), a drive box, a storage control node (with data storage drive), and a key management server according to the first embodiment.

FIG. 5 illustrates a configuration example of the HCI nodes 100, 101, and 102 (with data storage drive), the drive boxes 210 and 211, the storage control nodes 300, 301, and 302 (with data storage drive), and the key management server 130. These include one or more CPUs 500, one or more memories 505, one or more drives 510 (drive 0) for storing a system software program, an application program, and the like, a first network communication unit 507 (Network Interface Card: NIC), a second network communication unit 509 (Host Bus Adapter: HBA), and one or more drives 511, 512, and 513 (drives 1, 2, and 3) for storing data.

There is a case where a plurality of the first network communication units 507 and a plurality of the second network communication units 509 are provided. The first network communication unit 507 and the second network communication unit 509 are interfaces for communicating with other HCI nodes, storage control nodes, compute nodes, and drive boxes through the data communication network 110, the storage communication network 311, and the back-end communication network 310.

Examples of the system software program stored in the drive 510 include a virtual machine monitor (hypervisor) or a bare-metal OS for constructing a virtual environment on the own node, a software program (hereinafter, storage control program) for implementing a function of storage, and a guest OS operating on the hypervisor. The storage control program may be in a form of operating in any of the hypervisor, the guest OS on the hypervisor, and the bare-metal OS. In an environment where an operating hypervisor operates, the storage control program may operate on the guest OS.

The CPU 500 is a processor that controls overall operations of the HCI node, the drive box, the storage control node, and the key management server. The memory 505 is implemented using a volatile semiconductor memory such as a static random access memory (SRAM) or a dynamic random access memory (DRAM), or a nonvolatile semiconductor memory, and is used for temporarily retaining various programs and necessary data as a work memory of the CPU 500. When at least one or more CPUs 500 execute the program stored in the memory 505, various processing described later are executed. The drives 510, 511, 512, and 513 (drives 0, 1, 2, and 3) include large-capacity, nonvolatile storage devices such as hard disk drives (HDD), solid state drives (SSD), and storage class memories (SCM). These include interfaces such as non-volatile memory express (NVMe), serial attached SCSI (SAS), and serial ATA (SATA).

The present embodiment assumes that the cryptographic arithmetic accelerators 501 and 508 (CPUCryptoAcc and NICCryptoAcc) are implemented on both or any of the CPU 500 and the first network communication unit 507. The cryptographic arithmetic accelerator is encryption/decryption-dedicated hardware, and is an arithmetic unit incorporated in the CPU 500 or an arithmetic unit incorporated in the first network communication unit 507. The cryptographic arithmetic accelerator can be used by passing a dedicated command code and a value (for example, data or argument, and hereinafter referred to as command value) for the command code to the CPU 500 and the network communication unit 507. The data for the command code is, for example, key data, and the argument for the command code is a variable or key data for referring to the key data passed to the command code, for example. It is assumed that use of the cryptographic arithmetic accelerator enables cryptographic processing to be completed faster than that when the cryptographic arithmetic accelerator is not used. Details of the programs and data placed in the memory 505 on the HCI nodes 100, 101, and 102 (with data storage drive) will be described later with reference to FIG. 8. Details of the programs and data placed in the memory 505 on the storage control nodes 300, 301, and 302 (with data storage drive) will be described later with reference to FIG. 9.

Figure 6:
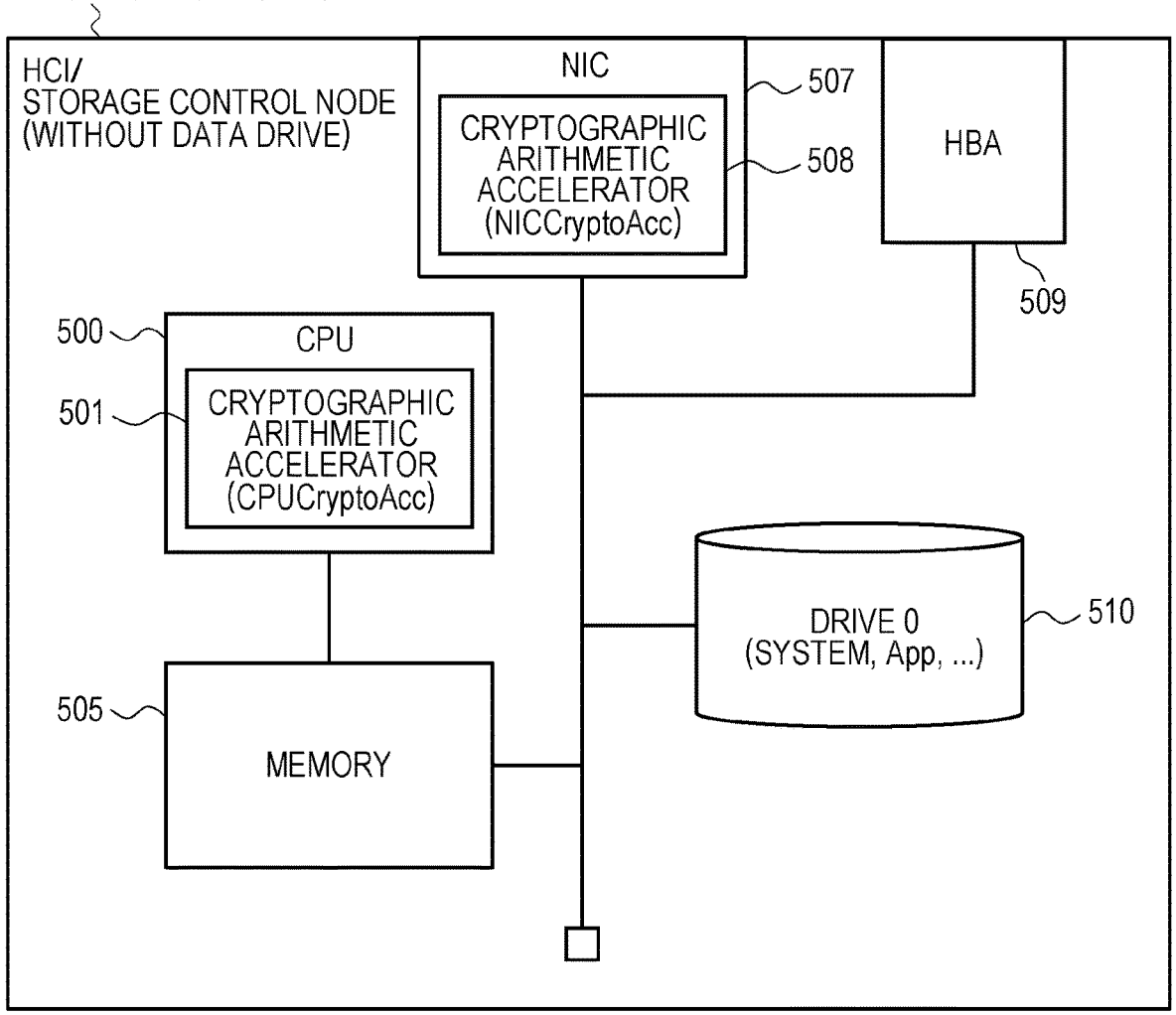
FIG. 6 is a diagram illustrating an example of configurations of an HCI node (without data storage drive) and a storage control node (without data storage drive) according to the first embodiment.

FIG. 6 illustrates a configuration example of the HCI nodes 200, 201, and 202 (without data storage drive) and the storage control nodes 400, 401, and 402 (without data storage drive). These are the same as configurations illustrated in FIG. 5 except absence of data storage drives 511, 512, and 513. Details of the programs and data placed in the memory 505 of the HCI nodes 200, 201, and 202 will be described later with reference to FIG. 8. Details of the programs and data placed in the memory 505 of the storage control nodes 400, 401, and 402 will be described later with reference to FIG. 9.

Figure 7:
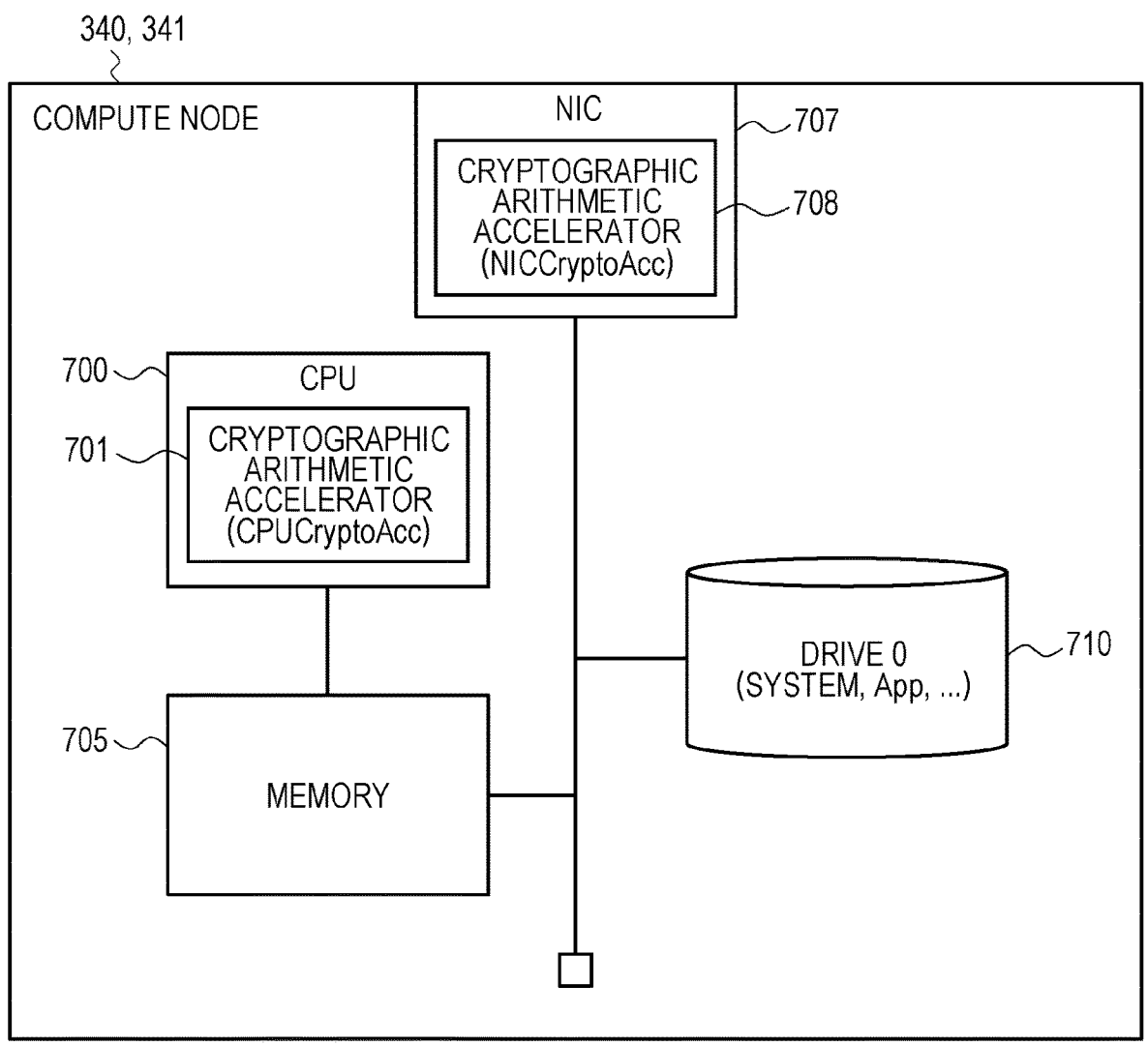
FIG. 7 is a diagram illustrating an example of a configuration of a compute node according to the first embodiment.

FIG. 7 illustrates an example of the configurations of the compute nodes 340 and 341. This is the same as the configuration illustrated in FIG. 5 except absence of the data storage drives 511, 512, and 513 and the second network communication unit 509. Details of the programs and data placed in the memory 505 of the compute nodes 340 and 341 will be described later with reference to FIG. 10.

Next, the programs and data placed, and used, in the memory in the HCI nodes 100, 101, and 102 (with data storage drive), the HCI nodes 200, 201, and 202 (without data storage drive), the storage control nodes 300, 301, and 302 (with data storage drive), the storage control nodes 400, 401, and 402 (without data storage drive), and the compute nodes 340 and 341 will be described with reference to FIGS. 8, 9, and 10.

Figure 8:
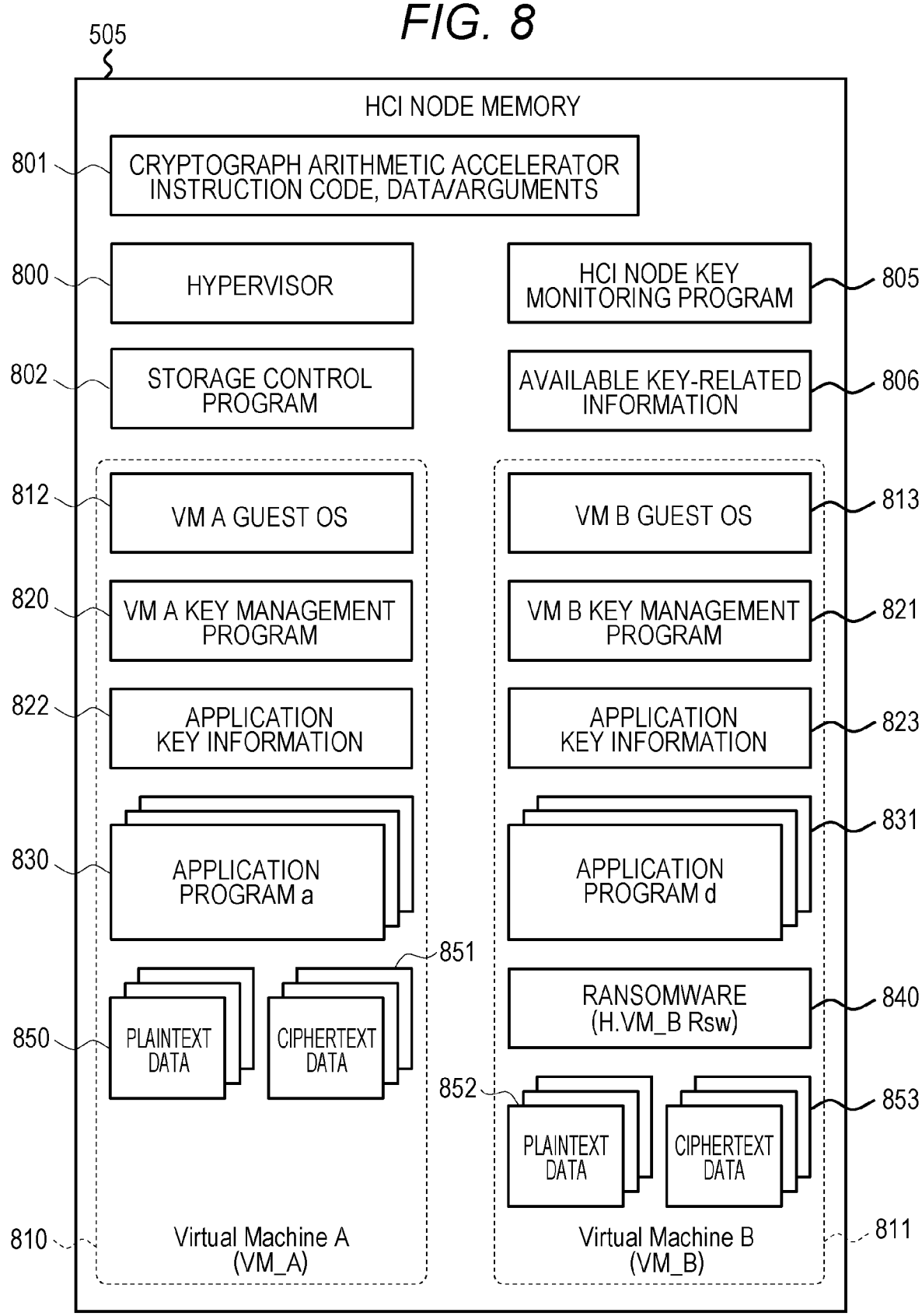
FIG. 8 is a diagram illustrating an example of a program and data placed on a memory of the HCI node according to the first embodiment.

FIG. 8 illustrates an example of the programs and data placed on the memory 505 of the HCI nodes 100, 101, and 102 (with data storage drive) or the HCI nodes 200, 201, and 202 (without data storage drive). At least the followings are placed in the memory 505.

A hypervisor 800, command information 801 (information including command codes and command values) to be passed to the cryptographic arithmetic accelerators 501 and 508, a storage control program 802, an HCI node key monitoring program 805, available key-related information 806 (information regarding a key permitted to use in the HCI node), a virtual machine A 810, and a virtual machine B 811

Note that in the virtual machine A 810, a virtual machine A guest OS 812, a plurality of application programs 830 (one with suffix a is displayed as a representative), application key information 822 (key for encryption/decryption used by the application program operating on the virtual machine), a virtual machine A key management program 820 that manages the key, and plaintext data 850 and ciphertext data 851 used by the application program 830 and the like are placed. The same applies to the virtual machine B 811 except that the ransomware operates. That is, in the virtual machine B 811, a virtual machine B guest OS 813, a plurality of application programs 831 (one with suffix d is displayed as a representative), application key information 823 (key for encryption/decryption used by the application program operating on the virtual machine), a virtual machine B key management program 821 that manages the key, ransomware 840, and plaintext data 852 and ciphertext data 853 used by the application program 831, the ransomware 840, and the like are placed on the memory 505.

The storage control program 802 controls writing of data from the virtual machine in the HCI node to the drive or the drive box and reading of data from the drive or the drive box requested from the virtual machine. Some storage control programs 802 perform, when writing data, the processing after encrypting the data. The encryption function is called stored data encryption. One example of the available key-related information 806 in the HCI node is for the stored data encryption. Other than that, the key-related information 806 also includes keys used in a plurality of virtual machines having been constructed. The key used in the virtual machine is placed on the memory as a part of the available key-related information 806 by the HCI node key monitoring program 805 and the virtual machine key management program operating in each virtual machine communicating with each other. The roles of the other programs and how to use data will be described in the description of the processing sequence illustrated in FIG. 15.

Figure 9:
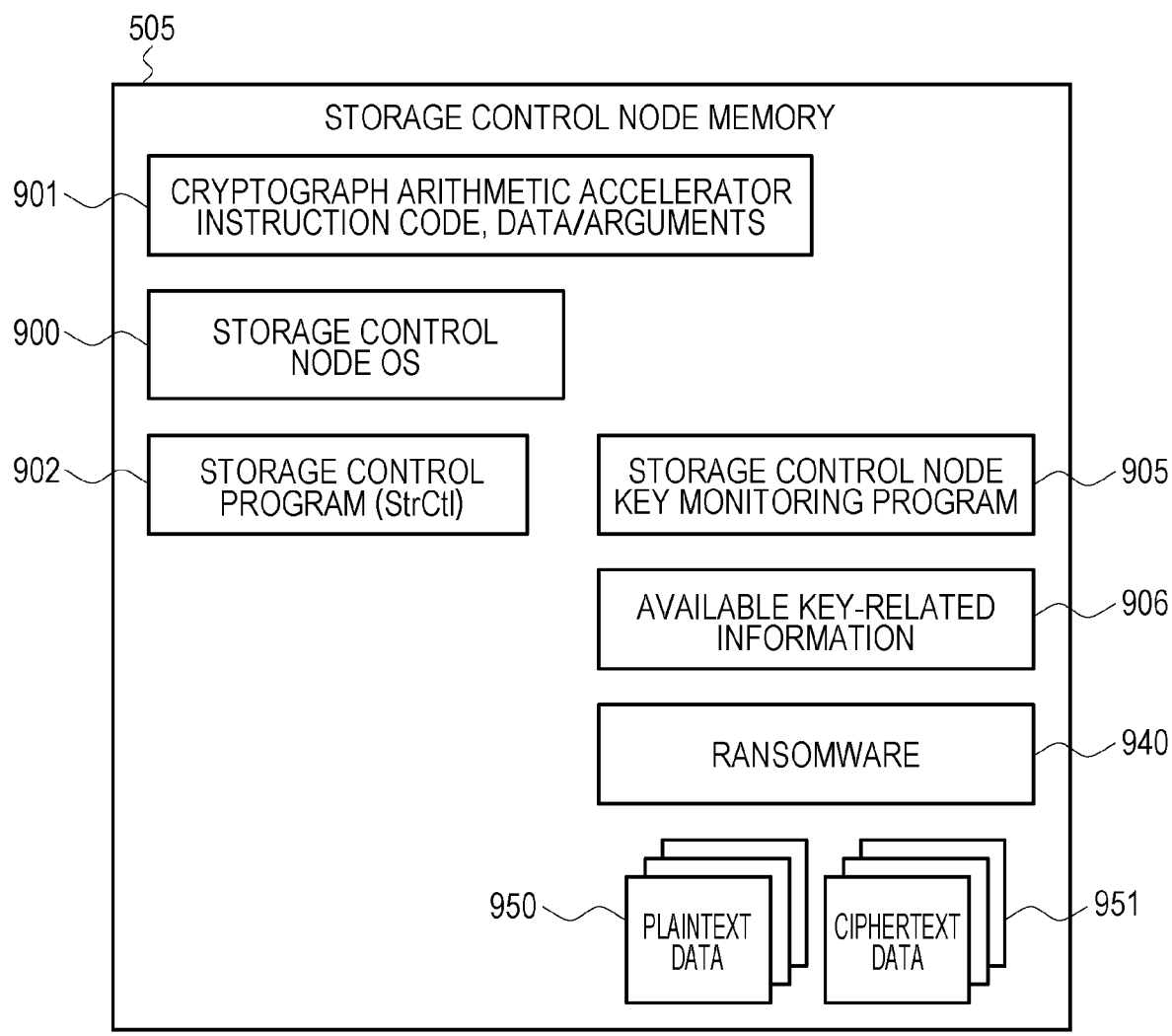
FIG. 9 is a diagram illustrating an example of a program and data placed on a memory of the storage control node according to the first embodiment.

FIG. 9 illustrates an example of the programs and data placed on the memory 505 of the storage control nodes 300, 301, and 302 (with data storage drive) or the storage control nodes 400, 401, and 402 (without data storage drive). At least the followings are placed in the memory 505.

A storage control node OS 900 (bare-metal OS for the storage control node), command information 901 (information including a command code and a command value) to be passed to the cryptographic arithmetic accelerators 501 and 508, a storage control program 902 (StrCtl), a storage control node key monitoring program 905, available key-related information 906 (information regarding a key permitted to use in the storage control node), ransomware 940, and plaintext data 950 and ciphertext data 951 that are written to a drive or a drive box by the storage control node or read from the drive or the drive box The function of the storage control program 902 is the same as the function of the storage control program 802 in the HCI node except that the request source of writing and reading for the storage control program is a compute node. Therefore, the key used for the stored data encryption and the information regarding the key are one example of the available key-related information 906 similarly to the case of the HCI node. The present embodiment assumes that the storage control program 902 operates on the storage control node OS 900, but a form in which a virtual machine is constructed on a hypervisor and the storage control program 902 operates on a guest OS in the virtual machine may be adopted. The storage control node illustrated in FIG. 9 assumes that the ransomware 940 is operating.

Figure 10:
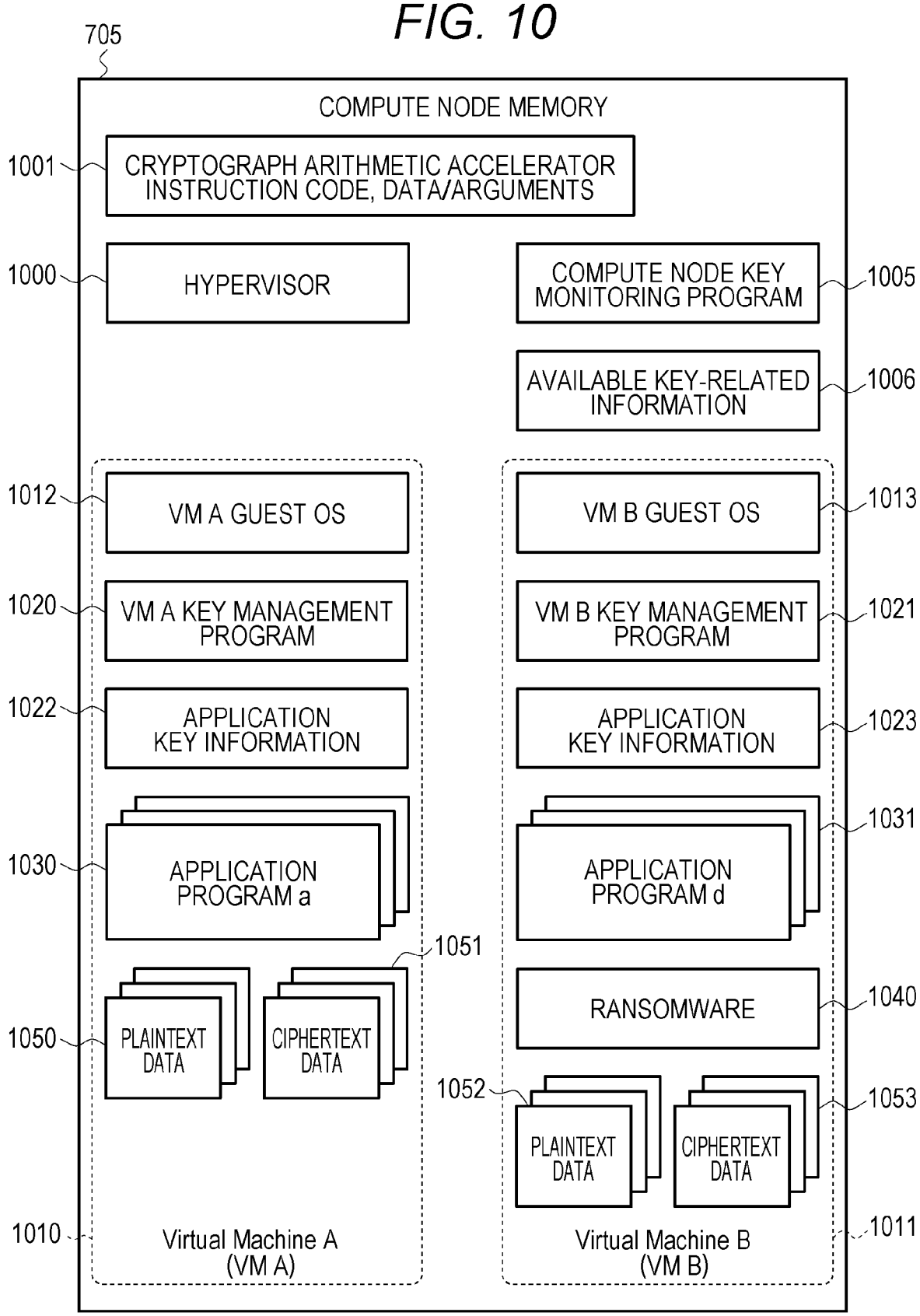
FIG. 10 is a diagram illustrating an example of a program and data placed on a memory of the compute node according to the first embodiment.

FIG. 10 illustrates an example of the programs and data placed on a memory 705 of the compute nodes 340 and 341. The programs and data placed on the memory 705 of the compute node are the same as those of the HCI node except absence of a storage control program in the memory 705. Numbers given to the programs and data to be placed are as follows.

A hypervisor 1000, command information 1001 (information including a command code and a command value) to be passed to the cryptographic arithmetic accelerators 701 and 708, a compute node key monitoring program 1005, available key-related information 1006 (information regarding a key permitted to use in the compute node), a virtual machine A 1010, a virtual machine A guest OS 1012, a plurality of application programs 1030 (one with suffix a is displayed as a representative) operating on the virtual machine A guest OS 1012, application key information 1022 (key for encryption/decryption used by the application program operating on the virtual machine), a virtual machine A key management program 1020 that manages the key, plaintext data 1050 and ciphertext data 1051 used by the application program 1030 or the like, a virtual machine B 1011, a virtual machine B guest OS 1013, a plurality of application programs 1031 (one with suffix d is displayed as a representative) operating on the virtual machine B guest OS 1013, application key information 1023 (key for encryption/decryption used by the application program operating on the virtual machine), a virtual machine B key management program 1021 that manages the key, plaintext data 1052 and ciphertext data 1053 used by the application program 1031, ransomware 1040, and the like The virtual machine B 1011 illustrated in FIG. 10 assumes that the ransomware 1040 is operating, similarly to FIG. 8.

Next, an example of content registered in the information (the available key-related information 806, 906, and 1006) related to the key permitted to use that are placed on the memories of the HCI node, the storage control node, and the compute node will be described with reference to FIGS. 11, 12, and 13.

FIG. 11 illustrates an example of the available key-related information 806 placed on the memory of the HCI node. The available key-related information 806 includes at least information specifying an entity that uses a key (key usage entity identifier 1100) and a value of a key permitted to use by the entity (key value 1101). In the present embodiment, since it is assumed that the storage control program operating on the hypervisor, the virtual machine A, and the virtual machine B perform encryption/decryption processing, identifiers specifying them and key values used by them are registered in the available key-related information 806.

In FIG. 11, a hash value 1102 of the key value 1101 is also included. This is because by evaluating whether the hash value of a comparison target key matches the value in a case where, for example, the length of the key is relatively long, whether the comparison target key is included in the available key-related information 806 can be determined in a shorter time. Therefore, it is not essential that the hash value 1102 is included in the available key-related information 806. The key value and the hash value are examples of key data.

FIG. 12 illustrates an example of the available key-related information 906 placed on the memory of the storage control node. The items included in the available key-related information 906 are the same as the items included in the available key-related information 806 placed on the memory of the HCI node. In the present embodiment, since it is assumed that the entity that uses the key is only the storage control program, a key usage entity identifier 1200 includes only an identifier for specifying the storage control program. When another program performs the encryption/decryption processing, the key usage entity identifier 1200 that specifies the program and a key value 1201 used by the program are registered in the available key-related information 906.

FIG. 13 illustrates an example of the available key-related information 1006 placed on the memory of the compute node. The items included in the available key-related information 1006 are the same as the items included in the available key-related information 806 placed on the memory of the HCI node. In the present embodiment, since it is assumed that the virtual machine A and the virtual machine B perform the encryption/decryption processing, a key usage entity identifier 1300 that specifies them and a key value 1301 used by them are registered in the available key-related information 1006. The role and the necessity of a hash value 1302 are the same as those of the hash value 1102.

Next, an example of the command information 801, 901, and 1001 to be passed to the cryptographic arithmetic accelerator that are placed on the memories of the HCI node, the storage control node, and the compute node will be described with reference to FIG. 14.

In a command code 1400, a command code defined for using a cryptographic arithmetic accelerator is placed. In data/arguments 1401, data or an argument (command value) to be passed to the accelerator together with the command code 1400 is placed. FIG. 14 illustrates a scene in which a key value has already been set in an rdx register, and after moving this to an xmml register, the cryptographic arithmetic accelerator is caused to generate a key for encryption/decryption by using the value set in the xmml register and the value "0".

Next, processing sequence for preventing ransomware from breaching data stored in the drive or the drive box by overwriting with ciphertext data in a case where the ransomware encrypts data using the cryptographic arithmetic accelerator on the virtual machine B operating on the information processing system in the HCI type information processing system illustrated in FIGS. 1 and 2 will be described with reference to FIG. 15.

Figure 15:
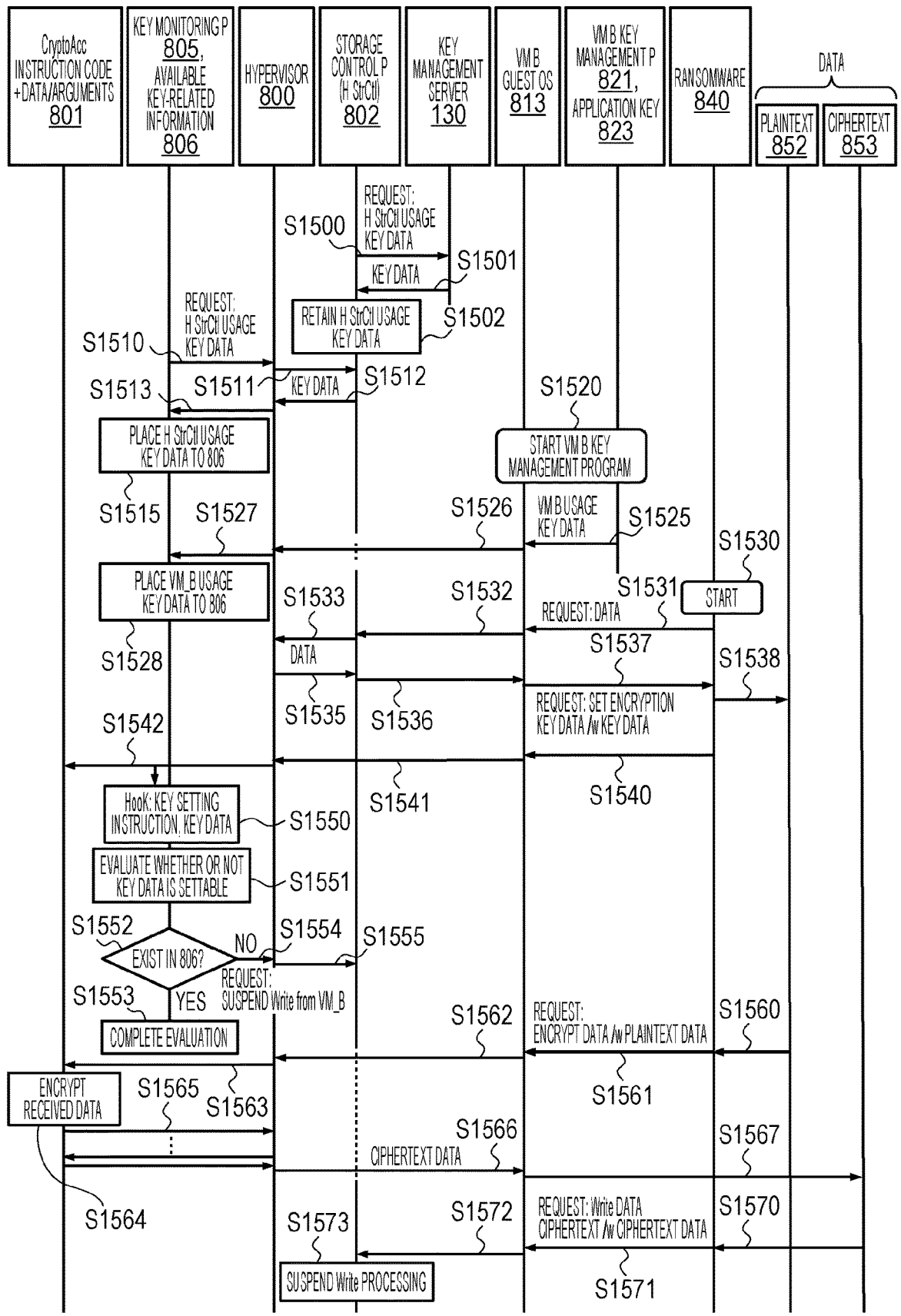
FIG. 15 is a diagram illustrating an example of processing sequence according to the first embodiment.

The processing sequence illustrated in FIG. 15 includes a program and data placed on the memory 505 of the HCI node illustrated in FIG. 8, and communication and processing performed between the program and the key management server 130.

When the HCI nodes 100, 101, 102, 200, 201, and 202 (all that written left, and numbers are omitted below) are started, the storage control program 802 (denoted as H StrCtl in FIG. 15) requests key data to be used by itself from the key management server 130 (S1500), and the key management server 130 transmits the requested key data to the storage control program 802 (S1501). Note that the transmission of the request and the key data is not necessarily executed with the key management server 130. For example, in a case where the storage control program 802 operating in each of the plurality of HCI nodes constitutes a cluster, and the information processing system is configured such that a master node managing the cluster acquires a key from the key management server 130, a form in which the storage control program 802 in each HCI node issues the request to the storage control program 802 in the master node that has acquired the key from the key management server 130, and the master node transmits the requested key data may be adopted.

The storage control program 802 retains the received key data in an area on the memory 505 managed by itself (S1502).

Subsequently, the HCI node key monitoring program 805 requests key data used by the storage control program 802 from the storage control program 802 (S1510 and S1511). Upon receiving the request, the storage control program 802 transmits the key data used by itself (S1512 and S1513). Upon receiving the key data transmitted by the storage control program 802, the HCI node key monitoring program 805 adds the key data to the available key-related information 806 (S1515).

When the guest OS of the virtual machine constructed on the hypervisor 800 is started, a virtual machine key management program that manages the key used by the application program operating on the virtual machine is also started. FIG. 15 illustrates a scene in which the virtual machine B 811 is started (S1520). When the virtual machine B guest OS 813 and the virtual machine B key management program 821 are started, the virtual machine B key management program 821 transmits, to the HCI node key monitoring program 805, the key data used by the application program 831 operating on the virtual machine B 811 (S1525, 51526, and S1527). Upon receiving the key data transmitted by the key management program on each virtual machine, the HCI node key monitoring program 805 adds the key data to the available key-related information 806 (S1528). FIG. 15 illustrates, as one example, a scene in which the request is transmitted to the virtual machine B 811 (S1525 to S1528), but in a case where a plurality of virtual machines are constructed, the similar processing to that described above is also executed for them. With FIG. 8 as an example, similar processing is executed for the virtual machine A 810.

In addition to the processing executed when each of the virtual machines is started, also in a case where the key data used in each virtual machine is changed (added, updated, deleted, and the like), the key management program on each virtual machine transmits the executed processing (addition, update, deletion, and the like) and new key data (in a case of addition or update) to the HCI node key monitoring program 805.

Next, a case where after a virtual machine is started, ransomware is started in the virtual machine will be described with the virtual machine B 811 as an example. Upon completing starting (S1530), the ransomware 840 reads data stored in a storage area accessible from the virtual machine B 811. In FIG. 15, the ransomware 840 transmits a data read request to a drive or a drive box (S1531, S1532, and S1533), and the drive or the drive box that has received the request returns data (S1535, S1536, S1537, and S1538). The data received by the virtual machine B 811 is placed on the memory 505 as it is (plaintext data 852).

Subsequently, in order to encrypt the read plaintext data 852 using the cryptographic arithmetic accelerators 501 and 508 (hereinafter, assumed to be the cryptographic arithmetic accelerator 501), the ransomware 840 transmits, to the cryptographic arithmetic accelerator 501, a request for setting key data necessary for encryption to the cryptographic arithmetic accelerator 501 together with the key data to be set (S1540, S1541, and S1542). The data (command information 801) passed to the cryptographic arithmetic accelerator 501 for the key data setting is the command code and the command value illustrated in FIG. 14. A plurality of forms of the command code and command value described above are assumed, such as a case of being configured by a dedicated software program (library or the like) for using the cryptographic arithmetic accelerator 501 operating on a virtual machine, and a case of being configured by the ransomware 840 by itself. Whatever means is used, the hypervisor 800 is placed on the memory 505 in order to pass it to the cryptographic arithmetic accelerator 501 (S1542). The command information 801 has a form as illustrated in FIG. 14.

The set of the command code and the command value placed in the memory 505 from the hypervisor 800 is monitored by the HCI node key monitoring program 805. More specifically, the HCI node key monitoring program 805 acquires the command code and the command value placed in the memory 505 in the middle (S1550). Upon acquiring the command code and the command value, the HCI node key monitoring program 805 checks whether or not the acquired command code is for setting key data in the cryptographic arithmetic accelerator 501. When determining that, as a result of the check, the command code is for setting the key data to the cryptographic arithmetic accelerator 501, the HCI node key monitoring program 805 checks whether or not the key data (value specified by the data or the argument) of the command value is a value included in the available key-related information 806 permitted to use in the HCI node (S1551). When determining that, as a result of the checking, the key data of the command value is included in the available key-related information 806, the HCI node key monitoring program 805 ends the evaluation. On the other hand, when determining that the key data of the command value is not included in the available key-related information 806, the HCI node key monitoring program 805 requests the storage control program 802 to suspend the processing related to the write request from the virtual machine B 811 (S1554 and S1555).

While the HCI node key monitoring program 805 is executing the processing from 51550 to 51555, the ransomware 84 transmits, to the cryptographic arithmetic accelerator 501, a request for encrypting the plaintext data 852 and the plaintext data 852 that is an encryption target (S1560, S1561, S1562, and S1563). Upon receiving the plaintext data 852 in S1563, the cryptographic arithmetic accelerator 501 encrypts the received plaintext data 852 (S1564). The generated ciphertext data is retrieved from a register using a command code for the cryptographic arithmetic accelerator 501, transmitted to the virtual machine B 811 (S1565, S1566, and S1567), and finally placed on the memory 505 (ciphertext data 853). Subsequently, the ransomware 840 transmits the ciphertext data 853 and a write request for the ciphertext data 853 (S1570, S1571, and S1572).

The write request for the ciphertext data 853 and the ciphertext data 853 transmitted by the ransomware 840 are received by the storage control program 802 via the virtual machine B guest OS 813 (S1572). At this time, the storage control program 802 suspends (S1573) the execution of the processing related to the write request from the virtual machine B guest OS 813 based on the request (S1555) for suspending the write processing received in the past.

Next, processing sequence for preventing ransomware from breaching data stored in the drive or the drive box by overwriting with ciphertext data in a case where the ransomware encrypts data using the cryptographic arithmetic accelerator in the storage control node in the 3-Tier type information processing system illustrated in FIGS. 3 and 4 will be described with reference to FIG. 16.

Figure 16:
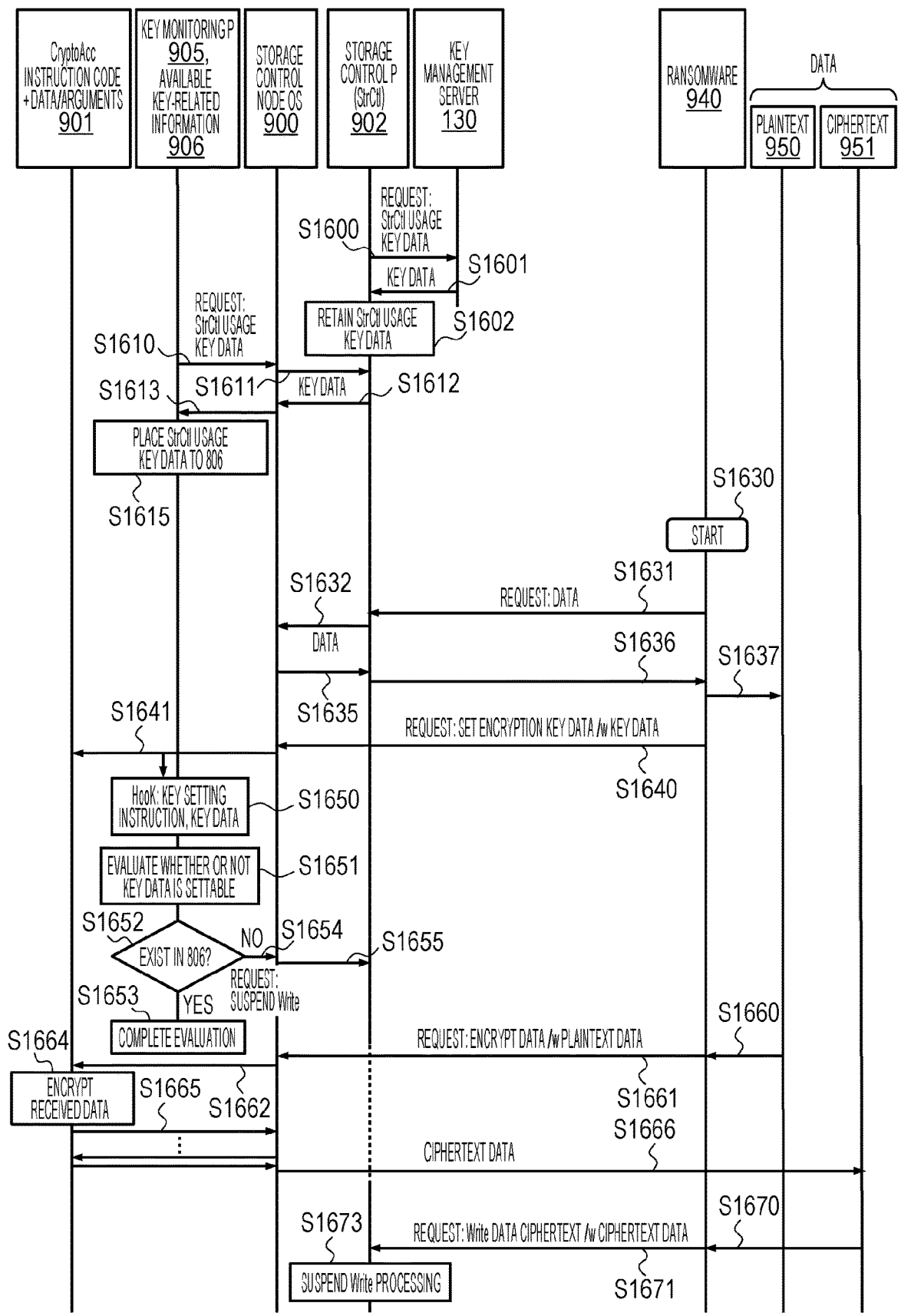
FIG. 16 is a diagram illustrating an example of the processing sequence according to the first embodiment.

The processing sequence illustrated in FIG. 16 includes a program and data placed on the memory 505 of the storage control node illustrated in FIG. 9, and communication and processing performed between the program and the key management server 130.

When the storage control nodes 300, 301, 302, 400, 401, and 402 (all that written left, and numbers are omitted below) are started, the processing of 51600 to 51615 are executed in the storage control node. The processing is the same as the processing from 51500 to 51515 in FIG. 15 except that the hypervisor 800 is replaced with an OS operating on the storage control node and the environment where each program operates is the storage control node. In FIG. 16, the storage control program 902 is denoted as StrCtl.

Next, a case where the ransomware 940 is started in the storage control node after the storage control node is started will be described. Upon completing starting (S1630), the ransomware 940 reads data stored in a storage area accessible from the storage control program 902. In FIG. 16, the ransomware 940 transmits a data read request to a drive or a drive box (S1631 and S1632), and the drive or the drive box that has received the request returns data (S1635, S1636, and S1637). The returned data is placed in its original form on the memory 505 (plaintext data 950).

Subsequently, in order to encrypt the read plaintext data 950 using the cryptographic arithmetic accelerators 501 and 508 (hereinafter, assumed to be the cryptographic arithmetic accelerator 501), the ransomware 940 transmits, to the cryptographic arithmetic accelerator 501, a request for setting key data necessary for encryption to the cryptographic arithmetic accelerator 501 together with the key data to be set (S1640 and S1641). The data (command information 901) passed to the cryptographic arithmetic accelerator 501 for the key data setting is the command code and the command value illustrated in FIG. 14. A plurality of forms of the command code and command value described above are assumed, such as a case of being configured by a dedicated software program (library or the like) for using the cryptographic arithmetic accelerator 501 operating on a virtual machine, and a case of being configured by the ransomware 940 by itself. Whatever means is used, the storage control node OS 900 is placed on the memory 505 in order to pass it to the cryptographic arithmetic accelerator 501 (S1641). The command information 901 has a form as illustrated in FIG. 14.

The set of the command code and the command value placed in the memory 505 from the storage control node OS 900 is monitored by the storage control node key monitoring program 905. More specifically, the storage control node key monitoring program 905 acquires the command code and the command value placed in the memory 505 in the middle (S1650). Upon acquiring the command code and the command value, the storage control node key monitoring program 905 checks whether or not the acquired command code is for setting key data in the cryptographic arithmetic accelerator 501. When determining that, as a result of the check, the command code is for setting the key data to the cryptographic arithmetic accelerator 501, the storage control node key monitoring program 905 checks whether or not the key data (value specified by the data or the argument) of the command value is a value included in the available key-related information 906 permitted to use in the storage control node (S1651). When determining that, as a result of the checking, the key data of the command value is included in the available key-related information 906, the storage control node key monitoring program 905 ends the evaluation. On the other hand, when determining that the key data of the command value is not included in the available key-related information 906, the storage control node key monitoring program 905 requests the storage control program 902 to suspend the write processing from the program that has transmitted the command code and the command value (S1654 and S1655).

While the storage control node key monitoring program 905 is executing the processing from S1650 to S1655, the ransomware 940 transmits, to the cryptographic arithmetic accelerator 501, a request for encrypting the plaintext data 950 and the plaintext data 950 that is an encryption target (S1660, S1661, and S1662). Upon receiving the plaintext data 950, the cryptographic arithmetic accelerator 501 encrypts the received plaintext data 950 (S1664). The generated ciphertext data is retrieved from a register using a command code for the cryptographic arithmetic accelerator 501, transmitted to the storage control program 902 (S1665 and S1666), and finally placed on the memory 505 (ciphertext data 951). Subsequently, the ransomware 940 transmits the ciphertext data 951 and a write request for the ciphertext data 951 (S1670 and S1671).

The write request for the ciphertext data 951 and the ciphertext data 951 transmitted by the ransomware 940 are received by the storage control program 902. At this time, the storage control program 902 suspends (S1673) the execution of the processing related to the write request based on the request (S1655) for suspending the write processing received in the past.

Next, processing sequence for preventing ransomware from breaching data stored in the drive or the drive box by overwriting with ciphertext data in a case where the ransomware encrypts data using the cryptographic arithmetic accelerator in a virtual machine operating on a compute node in the 3-Tier type information processing system illustrated in FIGS. 3 and 4 will be described with reference to FIG. 17.

Figure 17:
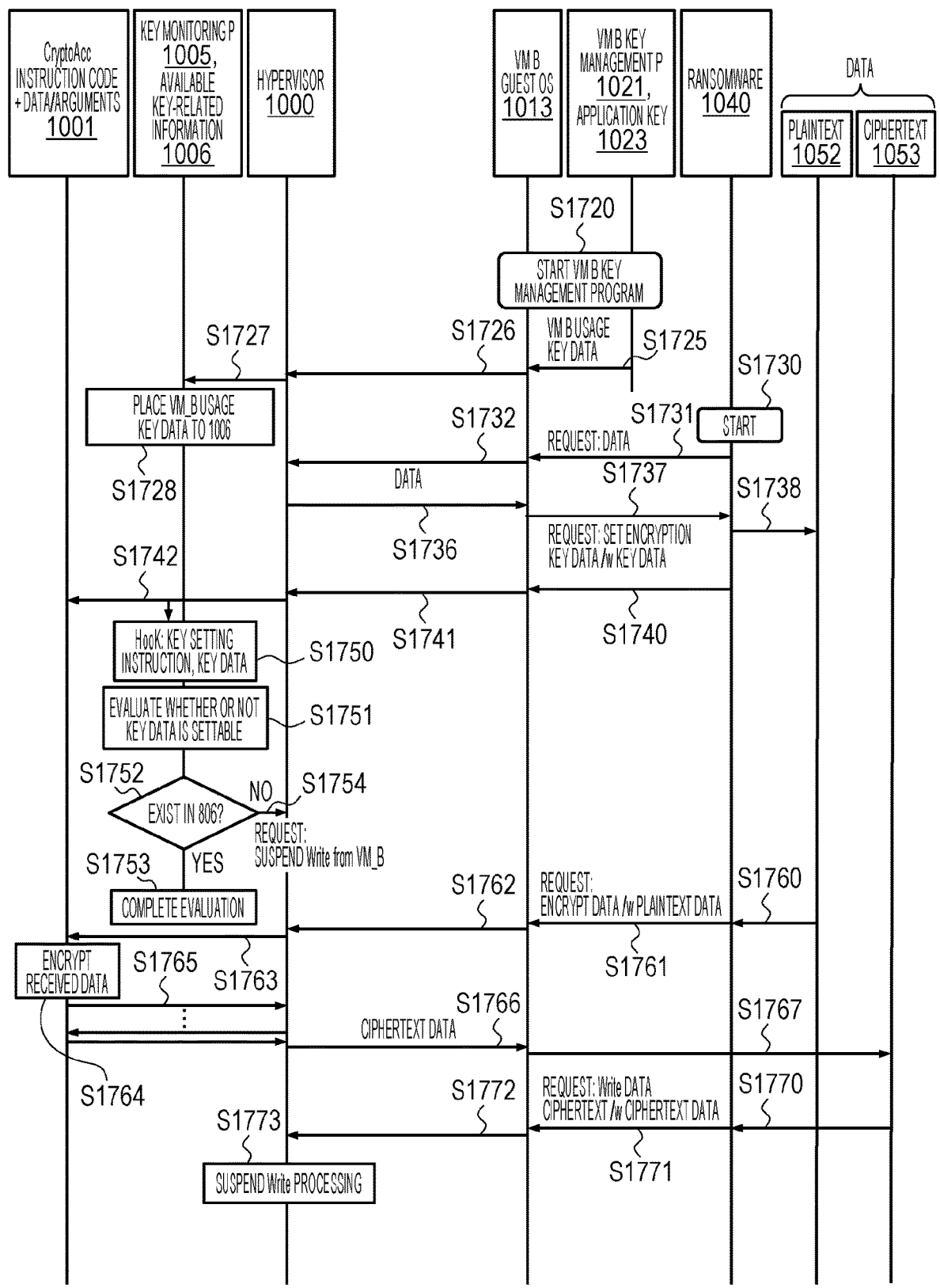
FIG. 17 is a diagram illustrating an example of the processing sequence according to the first embodiment.

The processing sequence illustrated in FIG. 17 includes communication and processing performed between the program and data placed on the memory 705 of the compute node illustrated in FIG. 10.

When the guest OS of the virtual machine constructed on the hypervisor 1000 is started, a virtual machine key management program that manages the key used by the application program operating on the virtual machine is also started. FIG. 17 illustrates a scene in which the virtual machine B 1011 is started (S1720). When the virtual machine B guest OS 1013 and the virtual machine B key management program 1021 are started, the virtual machine B key management program 1021 transmits, to the compute node key monitoring program 1005, the key data used by the application program 1031 operating on the virtual machine B 1011 (S1725, 51726, and S1727). Upon receiving the key data transmitted by the key management program on each virtual machine, the compute node key monitoring program 1005 adds the key data to the available key-related information 1006 (S1728). FIG. 17 illustrates, as one example, a scene in which the request is transmitted to the virtual machine B 1011 (S1725 to S1728), but in a case where a plurality of virtual machines are constructed, the similar processing to that described above is also executed for them. With FIG. 10 as an example, similar processing is executed for the virtual machine A 1010.

In addition to the processing executed when each of the virtual machines is started, also in a case where the key data used in each virtual machine is changed (added, updated, deleted, and the like), the key management program on each virtual machine transmits the executed processing (addition, update, deletion, and the like) and new key data (in a case of addition or update) to the compute node key monitoring program 1005.

Next, a case where the ransomware is started in the virtual machine after the virtual machine is started will be described with the virtual machine B 1011 as an example. Upon completing starting (S1730), the ransomware 1040 reads data stored in a storage area accessible from the virtual machine B 1011. In FIG. 17, the ransomware 1040 transmits a data read request to a drive or a drive box (S1731 and S1732), and the drive or the drive box that has received the request returns data (S1736, 51737, and S1738). The data received by the virtual machine B 1011 is placed on the memory 705 as it is (plaintext data 1052).

Subsequently, in order to encrypt the read plaintext data 1052 using the cryptographic arithmetic accelerators 701 and 708 (hereinafter, assumed to be the cryptographic arithmetic accelerator 701), the ransomware 1040 transmits, to the cryptographic arithmetic accelerator 701, a request for setting key data necessary for encryption to the cryptographic arithmetic accelerator 701 together with the key data to be set (S1740, 51741, and S1742). The data (command information 1001) passed to the cryptographic arithmetic accelerator 701 for the key data setting is the command code and the command value illustrated in FIG. 14. A plurality of forms of the command code and command value described above are assumed, such as a case of being configured by a dedicated software program (library or the like) for using the cryptographic arithmetic accelerator 701 operating on a virtual machine, and a case of being configured by the ransomware by itself. Whatever means is used, the command information 1001 placed on the memory 705 by the hypervisor 1000 in order to pass it to the cryptographic arithmetic accelerator 701 has a form as illustrated in FIG. 14.

The set of the command code and the command value placed in the memory 705 from the hypervisor 1000 is monitored by the compute node key monitoring program 1005. More specifically, the compute node key monitoring program 1005 acquires the command code and the command value placed in the memory 705 in the middle (S1750). Upon acquiring the command code and the command value, the compute node key monitoring program 1005 checks whether or not the acquired command code is for setting key data in the cryptographic arithmetic accelerator 701. When determining that, as a result of the check, the command code is for setting the key data to the cryptographic arithmetic accelerator 701, the compute node key monitoring program 1005 checks whether or not the key data (value specified by the data or the argument) of the command value is a value included in the available key-related information 1006 permitted to use in the compute node (S1751). When determining that, as a result of the checking, the key data of the command value is included in the available key-related information 1006, the compute node key monitoring program 1005 ends the evaluation. On the other hand, when determining that the key data of the command value is not included in the available key-related information 1006, the compute node key monitoring program 1005 requests the hypervisor 1000 to suspend the processing related to the write request from the virtual machine B 1011 (S1754).

While the compute node key monitoring program 1005 is executing the processing from 51750 to 51754, the ransomware 1040 transmits, to the cryptographic arithmetic accelerator 701, a request for encrypting the plaintext data 1052 and the plaintext data 1052 that is an encryption target (S1760, 51761, 51762, and S1763). Upon receiving the plaintext data 1052 (S1763), the cryptographic arithmetic accelerator 701 encrypts the received plaintext data 1052 (S1764). The generated ciphertext data is retrieved from a register using a command code for the cryptographic arithmetic accelerator 701, transmitted to the virtual machine B 1011 (S1765, S1766, and S1767), and finally placed on the memory 705 (ciphertext data 1053). Subsequently, the ransomware 1040 transmits the ciphertext data 1053 and a write request for the ciphertext data 1053 (S1770, S1771, and S1772).

The write request for the ciphertext data 1053 and the ciphertext data 1053 transmitted by the ransomware 1040 are received by the hypervisor 1000 via the virtual machine B guest OS 1013 (S1772). At this time, the hypervisor 1000 suspends (S1773) the execution of the processing related to the write request from the virtual machine B guest OS 1013 based on the request (S1754) for suspending the write processing received in the past.

According to the present embodiment, in a node including an accelerator, when intruded ransomware encrypts data using the accelerator and performs breach, the breach can be prevented early.

(II) Supplementary

The above-described embodiment includes, for example, the following content.

In the above-described embodiment, a case where the present invention is applied to an information processing system has been described, but the present invention is not limited to this, and can be widely applied to various other systems, devices, methods, and programs.

In the above-described embodiment, a case where ransomware is permitted to read plaintext data and make it ciphertext data using an accelerator, and is prohibited to overwrite the data has been described, but the present invention is not limited to this. For example, in a case where setting of key data not permitted to use is detected, reading of data of a drive or a drive box may be prohibited, reading of plaintext data of a memory may be prohibited, or encryption of plaintext data may be prohibited.

In the above-described embodiment, a case where the information processing system suspends processing related to writing of data to a storage space has been described, but the present invention is not limited to this. For example, the information processing system may suspend processing related to writing of data to the storage device (drive or drive box).

In the above-described embodiment, a case where the HCI node key monitoring program 805 acquires the command information 801 in S1542 has been described, but the present invention is not limited to this. For example, the HCI node key monitoring program 805 may acquire the command information 801 in S1540 or S1541.

In the above embodiment, a case where the storage control node key monitoring program 905 acquires the command information 901 in S1641 has been described, but the present invention is not limited to this. For example, the storage control node key monitoring program 905 may acquire the command information 901 in S1640.

In the above embodiment, a case where the compute node key monitoring program 1005 acquires the command information 1001 in S1742, but the present invention is not limited to this. For example, the compute node key monitoring program 1005 may acquire the command information 1001 in S1740 or S1741.

The above-described embodiment has, for example, the following characteristic configurations.

(1)

An information processing system (e.g., HCI type information processing system) includes: an accelerator (e.g., cryptographic arithmetic accelerators 501 and 508) that is capable of encrypting data; a storage device (e.g., drive and drive box); a compute unit (e.g., hypervisor 800, virtual machine A 810, and virtual machine B 811) that operates an application program (e.g., application programs 830 and 831); a storage control unit (e.g., storage control program 802) that processes a request for reading and writing data from and to a specific storage space issued by the compute unit in accordance with an instruction issued by the application program; and a monitor unit (e.g., HCI node key monitoring program 805) that monitors command information (e.g., command information 801) issued from the compute unit that sets, to the accelerator, key data used by the compute unit specified by the application program in order for the application program to encrypt data using the accelerator, in which when having detected that key data set in the accelerator by the command information is not key data permitted to use, the monitor unit issues, to the storage control unit, a suspension request for suspending processing related to data writing (e.g., S1554 and S1555), the compute unit having received an instruction from an application program reads data from the storage device (e.g., S1531 to S1538), encrypts the read data using the accelerator (e.g., S1560 to S1567), and issues, to the storage control unit, an instruction to write the encrypted data into the storage device (e.g., S1570 to S1572), and when having received the suspension request, the storage control unit suspends processing related to writing of data to the storage device (e.g., S1573).

In the above configuration, for example, when it is detected that the key data set to the accelerator is unpermitted key data, processing related to writing is not performed, and therefore, it is possible to avoid a situation in which data in the storage device is overwritten after the key data is set by ransomware.

(2)

The compute unit includes a plurality of virtual machines capable of operating an application program, a virtual machine of the compute unit issues command information for setting, to the accelerator, key data used by the virtual machine specified by an application program provided in the virtual machine for the application program to encrypt data using the accelerator (e.g., S1540 to S1542), when having detected that key data set by command information is not key data permitted to use, the monitor unit issues, to the storage control unit, a suspension request for suspending processing related to writing of data by a virtual machine that has issued the command information (e.g., S1554 and S1555), and when having received the suspension request, the storage control unit suspends processing related to writing of data by the virtual machine to the storage device.

In the above configuration, for example, the HCI node suspends writing of data by the virtual machine into which ransomware has intruded, but does not suspend writing of data by another virtual machine, whereby it is possible to localize an influence on the system.

(3)

An information processing system (e.g., 3-Tier type information processing system) includes: an accelerator (e.g., cryptographic arithmetic accelerators 501 and 508) that is capable of encrypting data; a storage device (e.g., drive and drive box); a storage control unit (e.g., storage control program 902) that processes data for reading from and writing to the storage device; a compute unit (e.g., storage control node OS 900) that operates the storage control unit; and a monitor unit (e.g., storage control node key monitoring program 905) that monitors command information (e.g., command information 901) issued from the compute unit that sets, to the accelerator, key data used by the storage control unit specified by the application program in order for the application program to encrypt data using the accelerator, in which when having detected that key data set in the accelerator by the command information is not key data permitted to use (e.g., S1654 and S1655), the monitor unit issues, to the storage control unit, a suspension request for suspending processing related to data writing, the compute unit having received an instruction from an application program reads data from the storage device (e.g., S1631 to S1637), encrypts the read data using the accelerator (e.g., S1660 to S1666), and issues, to the storage control unit, an instruction to write the encrypted data into the storage device (e.g., S1670 and S1671), and when having received the suspension request, the storage control unit suspends processing related to writing of data to the storage device (e.g., S1673).

According to the above configuration, for example, when the ransomware intrudes into a storage control node, it is possible to avoid a situation in which data in the storage device is overwritten.

(4)

An information processing system (e.g., 3-Tier type information processing system) includes: an accelerator (e.g., cryptographic arithmetic accelerators 701 and 708) that is capable of encrypting data; a compute unit (e.g., hypervisor 1000, virtual machine A 1010, and virtual machine B 1011) that operates an application program, the compute unit that issues, to a storage control node (e.g., storage control nodes 300, 301, 302, 400, 401, and 402) that processes, a request for reading and writing data from and to a specific storage space issued by the compute unit in accordance with an instruction issued by the application program; and a monitor unit (e.g., compute node key monitoring program 1005) that monitors command information (command information 1001) issued from the compute unit that sets, to the accelerator, key data used by the compute unit specified by the application program in order for the application program to encrypt data using the accelerator, in which when having detected that key data set in the accelerator by the command information is not key data permitted to use, the monitor unit issues, to the compute unit, a suspension request for suspending processing related to data writing (e.g., S1754), the compute unit having received an instruction from an application program reads data from a storage device (e.g., S1731 to S1738), encrypts the read data using the accelerator (e.g., S1760 to S1767), and, when having received the suspension request, suspends issuance of an instruction to write the encrypted data into the storage device (e.g., S1773).

According to the above configuration, for example, when the ransomware intrudes into a compute node, it is possible to avoid a situation in which data in the storage device is overwritten.

(5)

The compute unit includes a plurality of virtual machines capable of operating an application program, a virtual machine of the compute unit issues command information for setting, to the accelerator, key data used by the virtual machine specified by an application program provided in the virtual machine for the application program to encrypt data using the accelerator (e.g., S1741 and S1742), when having detected that key data set by command information is not key data permitted to use, the monitor unit issues, to the compute unit, a suspension request for suspending processing related to writing of data by a virtual machine that has issued the command information (e.g., S1754), and when having received the suspension request, the compute unit suspends issuance of an instruction for writing of data by the virtual machine to the storage device (e.g., S1773).

In the above configuration, for example, the compute node suspends writing of data by the virtual machine into which ransomware has intruded, but does not suspend writing of data by another virtual machine, whereby it is possible to localize an influence on the system.

The above-described configuration may be changed, replaced, combined, or omitted as appropriate within the scope without departing from the gist of the present invention.

It should be understood that items included in a list in the form "at least one of A, B, and C" can mean (A), (B), (C), (A and B), (A and C), (B and C), or (A, B, and C). Similarly, items listed in the form "at least one of A, B, or C" can mean (A), (B), (C), (A and B), (A and C), (B and C), or (A, B, and C).

The invention claimed is:

1. An information processing system comprising:
an accelerator that is capable of encrypting data;
a storage device;
a compute unit that operates an application program, wherein the compute unit includes a plurality of virtual machines capable of operating the application program;
a storage control unit that processes a request for reading and writing data from and to a specific storage space issued by the compute unit in accordance with an instruction issued by the application program;
a monitor unit that monitors command information issued from the compute unit that sets, to the accelerator, key data used by the compute unit specified by the application program in order for the application program to encrypt data using the accelerator, wherein
when having detected that the key data set in the accelerator by the command information is not key data permitted to use, the monitor unit issues, to the storage control unit, a suspension request for suspending processing related to data writing,
the compute unit having received an instruction from the application program, reads data from the storage device, encrypts the read data using the accelerator, and issues, to the storage control unit, an instruction to write the encrypted data into the storage device, and when having received the suspension request, the storage control unit suspends processing related to writing of data to the storage device; and a virtual machine of the compute unit issues command information for setting, to the accelerator, key data used by the virtual machine specified by the application program provided in the virtual machine for the application program to encrypt data using the accelerator, when having detected that the key data set by the command information issued from the virtual machine is not the key data permitted to use, the monitor unit issues, to the storage control unit, a suspension request for suspending processing related to writing of data by the virtual machine that has issued the command information, and when having received the suspension request for suspending processing related to writing of data by the virtual machine, the storage control unit suspends processing related to writing of data by the virtual machine to the storage device.

2. An information processing system comprising:
an accelerator that is capable of encrypting data;
a storage device;
a storage control unit that processes data for reading from and writing to the storage device;
a compute unit that operates the storage control unit, wherein the compute unit includes at least one virtual machine capable of operating an application program;
a monitor unit that monitors command information issued from the compute unit that sets, to the accelerator, key data used by the storage control unit specified by the application program in order for the application program to encrypt the data using the accelerator, wherein when having detected that the key data set in the accelerator by the command information is not key data permitted to use, the monitor unit issues, to the storage control unit, a suspension request for suspending processing related to data writing, the compute unit having received an instruction from the application program, reads data from the storage device, encrypts the read data using the accelerator, and issues, to the storage control unit, an instruction to write the encrypted data into the storage device, and when having received the suspension request, the storage control unit suspends processing related to writing of data to the storage device; and a virtual machine of the at least one virtual machine of the compute unit issues command information for setting, to the accelerator, key data used by the virtual machine specified by the application program provided in the virtual machine for the application program to encrypt data using the accelerator, when having detected that the key data set by the command information issued from the virtual machine is not the key data permitted to use, the monitor unit issues, to the storage control unit, a suspension request for suspending processing related to writing of data by the virtual machine that has issued the command information, and when having received the suspension request for suspending processing related to writing of data by the virtual machine, the storage control unit suspends processing related to writing of data by the virtual machine to the storage device.

3. An information processing system comprising:
an accelerator that is capable of encrypting data;
a compute unit that operates an application program, the compute unit issuing to a storage control node that processes, a request for reading and writing data from and to a specific storage space issued by the compute unit in accordance with an instruction issued by the application program; and
a monitor unit that monitors command information issued from the compute unit that sets, to the accelerator, key data used by the compute unit specified by the application program in order for the application program to encrypt data using the accelerator, wherein when having detected that the key data set in the accelerator by the command information is not key data permitted to use, the monitor unit issues, to the compute unit, a suspension request for suspending processing related to data writing, the compute unit having received an instruction from the application program reads data from a storage device, encrypts the read data using the accelerator, and, when having received the suspension request, suspends issuance of an instruction to write the encrypted data into the storage device.

4. An information processing system comprising:
an accelerator that is capable of encrypting data;
a compute unit that operates an application program, the compute unit includes a plurality of virtual machines capable of operating the application program, and the compute unit issuing to a storage control node that processes, a request for reading and writing data from and to a specific storage space issued by the compute unit in accordance with an instruction issued by the application program;
a monitor unit that monitors command information issued from the compute unit that sets, to the accelerator, key data used by the compute unit specified by the application program in order for the application program to encrypt data using the accelerator, wherein when having detected that the key data set in the accelerator by the command information is not key data permitted to use, the monitor unit issues, to the compute unit, a suspension request for suspending processing related to data writing, the compute unit having received an instruction from the application program reads data from a storage device, encrypts the read data using the accelerator, and, when having received the suspension request, suspends issuance of an instruction to write the encrypted data into the storage device; and a virtual machine of the compute unit issues command information for setting, to the accelerator, key data used by the virtual machine specified by the application program provided in the virtual machine for the application program to encrypt data using the accelerator, when having detected that key data set by the command information issued from the virtual machine is not the key data permitted to use, the monitor unit issues, to the compute unit, a suspension request for suspending processing related to writing of data by the virtual machine that has issued the command information, and when having received the suspension request for suspending processing related to writing of data by the virtual machine, the compute unit suspends issuance of an instruction for writing of data by the virtual machine to the storage device.

\* \* \* \* \*